(12) United States Patent
Lee et al.

(10) Patent No.: US 11,115,253 B2
(45) Date of Patent: Sep. 7, 2021

(54) METHOD AND DEVICE FOR PERFORMING COMMUNICATION BY USING ORTHOGONAL OR NON-ORTHOGONAL CODE MULTIPLE ACCESS SCHEME IN WIRELESS COMMUNICATION SYSTEM

(71) Applicant: LG ELECTRONICS INC., Seoul (KR)

(72) Inventors: Hojae Lee, Seoul (KR); Sangrim Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 139 days.

(21) Appl. No.: 16/480,911

(22) PCT Filed: Jan. 9, 2018

(86) PCT No.: PCT/KR2018/000388
§ 371 (c)(1),
(2) Date: Jul. 26, 2019

(87) PCT Pub. No.: WO2018/139782
PCT Pub. Date: Aug. 2, 2018

(65) Prior Publication Data
US 2021/0135919 A1 May 6, 2021

Related U.S. Application Data

(60) Provisional application No. 62/450,583, filed on Jan. 26, 2017.

(51) Int. Cl.
*H04L 27/26* (2006.01)
*H04J 13/10* (2011.01)
(Continued)

(52) U.S. Cl.
CPC .......... *H04L 27/2615* (2013.01); *H04J 13/10* (2013.01); *H04J 13/16* (2013.01); *H04W 52/146* (2013.01)

(58) Field of Classification Search
CPC ... H04L 27/2615; H04W 52/146; H04J 13/10; H04J 13/16
See application file for complete search history.

(56) References Cited

U.S. PATENT DOCUMENTS 8,169,959 B2    5/2012  Yang et al.
9,191,875 B1 * 11/2015  Kazeminejad ....... H04B 7/0623
(Continued)

FOREIGN PATENT DOCUMENTS

KR    1020110084468    7/2011

OTHER PUBLICATIONS

PCT International Application No. PCT/KR2018/000388, International Search Report dated Apr. 9, 2018, 14 pages.

*Primary Examiner* — Brian P Cox
(74) *Attorney, Agent, or Firm* — Lee, Hong, Degerman, Kang & Waimey

(57) ABSTRACT

Provided are a method and a device for transmitting uplink data by using a non-orthogonal code multiple access scheme in a wireless communication system. Particularly, a terminal receives control information from a base station. The terminal selects a terminal-specific codeword or receives allocation information of the terminal-specific codeword on the basis of the control information. The terminal transmits uplink data by using the terminal-specific codeword. The terminal-specific codeword is determined as a codeword having a value with a low peak-to-average power ratio (PAPR), when the terminal is located on the outside of a cell. The terminal-specific codeword is determined as a codeword (Continued)

having a value with a high PAPR, when the terminal is located in the center of the cell.

10 Claims, 23 Drawing Sheets

(51) Int. Cl.
*H04J 13/16* (2011.01)
*H04W 52/14* (2009.01)

(56) References Cited

U.S. PATENT DOCUMENTS

| | | | |
|---|---|---|---|
| 2011/0170625 A1* | 7/2011 | Blankenship | H04B 7/0456 375/295 |
| 2012/0207118 A1* | 8/2012 | Ma | H04J 11/0023 370/329 |
| 2015/0289264 A1* | 10/2015 | Sandberg | H04L 1/0026 370/329 |
| 2015/0358190 A1 | 12/2015 | Kruglick et al. | |
| 2015/0358924 A1 | 12/2015 | Papasakellariou | |
| 2016/0094303 A1 | 3/2016 | Sun et al. | |
| 2017/0013570 A1* | 1/2017 | Vajapeyam | H04W 52/242 |
| 2018/0097555 A1* | 4/2018 | Nammi | H04L 1/0009 |

* cited by examiner

METHOD AND DEVICE FOR PERFORMING COMMUNICATION BY USING ORTHOGONAL OR NON-ORTHOGONAL CODE MULTIPLE ACCESS SCHEME IN WIRELESS COMMUNICATION SYSTEM

CROSS-REFERENCE TO RELATED APPLICATIONS

This application is the National Stage filing under 35 U.S.C. 371 of International Application No. PCT/KR2018/000388, filed on Jan. 9, 2018, which claims the benefit of U.S. Provisional Application No. 62/450,583, filed on Jan. 26, 2017, the contents of which are hereby incorporated by reference herein in its entirety.

BACKGROUND OF THE INVENTION

Field of the Invention

The present specification relates to wireless communication, and more particularly, to a method of performing communication by using an orthogonal or non-orthogonal coded multiple access scheme, and a device using the method.

Related Art

A wireless communication system is widely deployed to provide various types of communication services, such as voice and data. An object of a wireless communication system is to enable a plurality of UEs to perform reliable communication regardless of their locations and mobility.

In general, a wireless communication system is a multiple access system capable of supporting communication with a plurality of UEs by sharing available radio resources. Examples of radio resources include time, a frequency, code, transmission power and so on. Examples of a multiple access system includes a time division multiple access (TDMA) system, a code division multiple access (CDMA) system, a frequency division multiple access (FDMA) system, an orthogonal frequency division multiple access (OFDMA) system, a single carrier frequency division multiple access (SC-FDMA) system and so on.

A requirement of a next-generation wireless communication system is to accommodate significantly explosive data traffic, to increase a dramatic increase in a transfer rate per user, to accommodate the significantly increased number of connected devices, and to support a very low end-to-end (E2E) latency and high energy efficiency. For this, there is ongoing research on various techniques such as dual connectivity, massive multiple input multiple output (MIMO), in-band full duplex, non-orthogonal multiple access (NOMA), super wideband support, device networking, or the like.

SUMMARY OF THE INVENTION

The present specification provides a method and apparatus for performing communication by using an orthogonal or non-orthogonal coded multiple access scheme in a wireless communication system.

The present specification proposes a method and apparatus for performing communication by using an orthogonal or non-orthogonal coded multiple access in a wireless communication system.

The apparatus includes a radio frequency (RF) unit transmitting and receiving a radio signal and a processor operatively coupled to the RF unit.

That is, the present embodiment assumes a wireless communication system environment in which a plurality of UEs in the cell performs communication using the spreading based multiple access scheme. The UE may perform the contention based uplink transmission, the semi-persistent scheduling based uplink transmission, or the scheduling based uplink transmission using the spreading based multiple access scheme. The spreading based multiple access scheme includes both an orthogonal coded multiple access scheme and a non-orthogonal coded multiple access scheme.

The UE receives control information from a base station. The control information includes information on a codeword configured by grassmannian sequence. The codeword is included in a codebook pre-defined for the non-orthogonal coded multiple access scheme. That is, the pre-defined codebook may correspond to a non-orthogonal codebook defined in advance between the UE and the base station. If the UE transmits scheduling based uplink data, the control information may correspond to an UL Grant (UL Grant) or Down Control Information (DCI). The control information may be predetermined at the transmitter/receiver according to a predetermined rule.

The control information may further include a codebook index corresponding to a UE-specific codeword determined by a spreading factor, a codeword index in the corresponding codebook, and an MCS level.

The UE may select the UE-specific codeword based on the control information or receive allocation information of the UE-specific codeword. That is, the UE may directly select the UE-specific codeword to be used by itself or use the UE-specific codeword indicated by the base station.

In this case, the UE-specific codeword may be determined in consideration of the position of the UE in the cell and the PAPR. Specifically, when the UE is located in the outside of the cell, the UE-specific codeword is determined as a codeword having a low Peak-to-Average Power Ratio (PAPR). When the UE is located at the center of the cell, the UE-specific codeword is determined as a codeword having a high PAPR value.

The procedure for the UE to directly select the UE-specific codeword is as follows.

The control information may be received via a control channel or a broadcast channel. The control channel or the broadcast channel may correspond to a channel for a higher layer signal, such as RRC signaling. Downlink received power may be measured by the terminal over the control channel or the broadcast channel Uplink received power may be measured by the base station based on a reference signal and a synchronization signal.

A geometry class may be selected by the UE based on the downlink received power. The geometry class may be determined according to/based on the position of the UE in the cell. For example, as the UE is far from the center of the cell (closer to the outside of the cell), the value of the geometry class may be the smaller and as the UE is closer to the center of the cell, the value of the geometry class may be the larger. That is, the geometry class may be aligned in the ascending order if the UE is located at the center of the cell from the outside of the cell.

In the definition of the geometry class, the definition of the geometry class may not be defined solely by a straight line distance between the UE and the base station. That is, the geometry class may be defined by a change in channel state caused by small-scale fading or shadowing affecting downlink received power. For example, if the geometric location of the UE is located near the center of the cell, but a signal strength is attenuated due to obstacles or diffraction, reflection, transmission characteristics of the signal, etc., the geometry class may be included in the lower geometry class.

The geometry class may be mapped to an index of the UE-specific codeword. A mapping relationship between the geometry class and the index of the UE-specific codeword may be defined as the look up table and shared by the UE and the base station. In addition, the look up table may be periodically transmitted through the control channel or the broadcast channel.

The UE-specific codeword may be selected by the UE based on the geometry class. That is, the UE may select the UE-specific codeword corresponding to the selected geometry class using the look up table.

If the geometry class is changed by mobility of the UE, the UE-specific codeword may be reselected according to/based on event triggering of the UE.

When the UE performs the scheduling based uplink transmission, the UE may report the geometry class to the base station. In this case, the geometry class may be determined according to/based on a power headroom of the UE irrespective of the position of the UE in the cell. That is, if the power headroom of the UE is large, even if the UE is located at the outermost side of the cell, the PAPR is not important, so that the value of the geometry class may be increased. When the value of the geometry class increases according to the power headroom of the UE, the UE may use the UE-specific codeword having the PAPR according to/based on the changed geometry class value.

The procedure for the UE to be indicated the UE-specific codeword from the base station is as follows.

The downlink received power may be reported to the base station. The geometry class may be selected by the base station based on the downlink received power or the uplink received power.

As an example, the UE-specific codeword may be allocated by the base station according to/based on the geometry class. The base station directly indicates the selected geometry class to the UE.

As another example, the uplink power control class of the UE determined by the base station may be received based on control information. Here, since the UE may perform the scheduling based uplink transmission, the control information may correspond to the UL grant or DCI. Therefore, the uplink data may be transmitted through the scheduled resource based on control information.

The uplink power control class may be mapped to an index of the UE-specific codeword. A mapping relationship between the uplink power control class and the index of the UE-specific codeword may be defined as the look up table and shared by the UE and the base station. In addition, the look up table may be periodically transmitted through the control channel or the broadcast channel.

The UE-specific codeword may be selected by the UE based on the uplink power control class. That is, the base station informs the uplink power control class without directly indicating the selected geometry class to the UE. The UE may identify the UE-specific codeword corresponding to the uplink power control class using the look up table.

When the geometry class is changed by the mobility of the UE, the changed geometry class may be detected by the base station based on the downlink received power or the uplink received power. The UE-specific codeword may be allocated by the base station according to/based on the changed geometry class.

The UE transmits the uplink data by using the UE-specific codeword. In this case, the UE may perform the contention based uplink transmission, the semi-persistent scheduling based uplink transmission, or the scheduling based uplink transmission using the spreading based multiple access (or non-orthogonal coded multiple access) scheme.

When a proposed scheme is used, PAPR performances of all terminals can be secured by considering a position of a terminal in a cell in a wireless communication system using a spread-based multiple access (or non-orthogonal coded multiple access) scheme.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink.

For clarity of explanation, the following description will focus on the 3GPP LTE/LTE-A. However, technical features of the present invention are not limited thereto.

Figure 1:
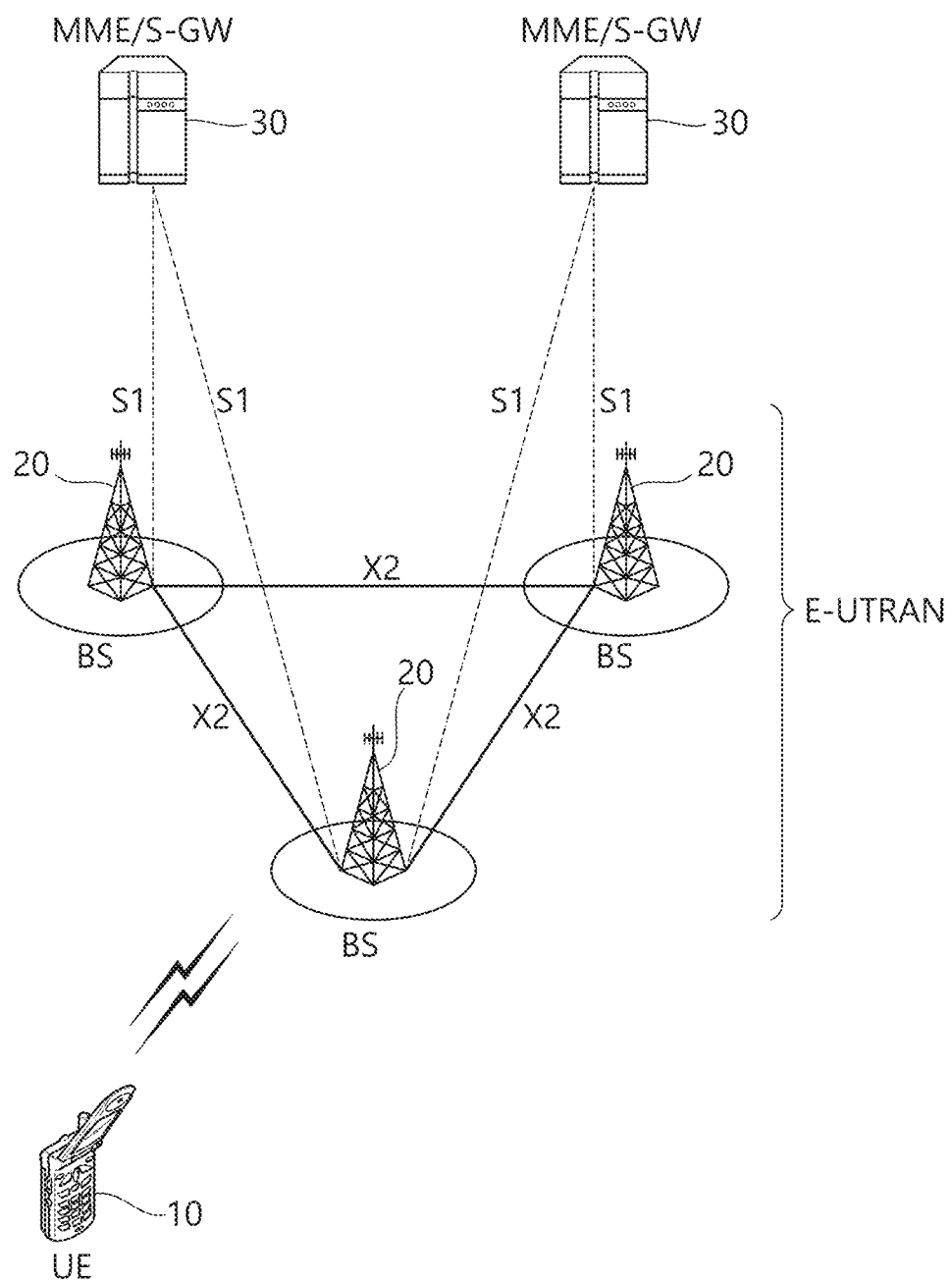
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

A radio interface between the UE and the BS is called a Uu interface. Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
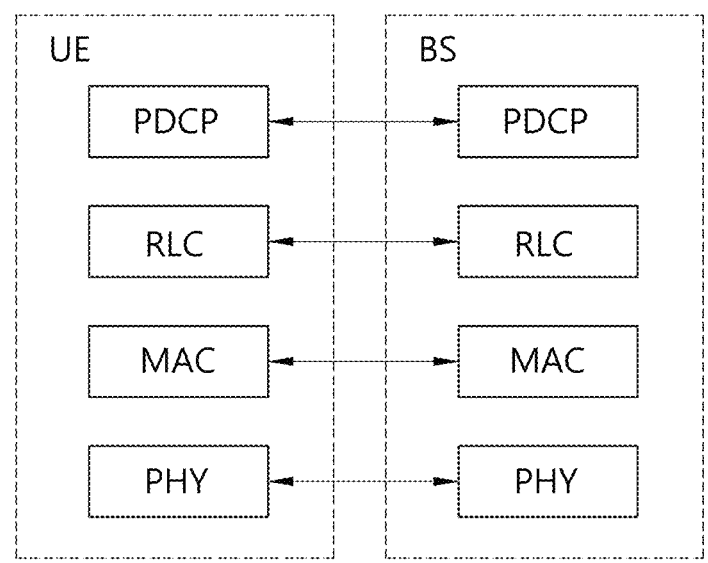
FIG. 2 is a diagram illustrating a radio protocol architecture for a user plane.
Figure 3:
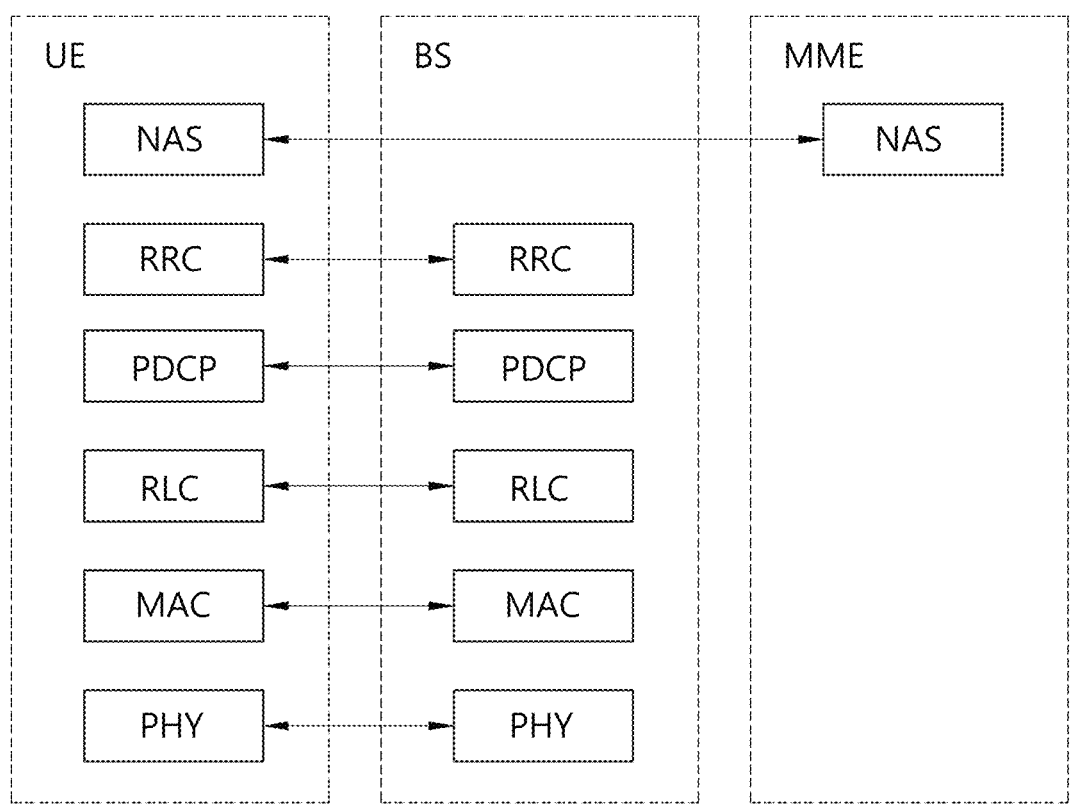
FIG. 3 is a diagram illustrating a radio protocol architecture for a control plane.

FIG. 2 is a diagram illustrating a radio protocol architecture for a user plane. FIG. 3 is a diagram illustrating a radio protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel Data is transferred between the MAC layer and the PHY layer through the transport channel. The transport channel is classified according to how and with what characteristics data is transmitted through a radio interface.

Between different PHY layers, i.e., a PHY layer of a transmitter and a PHY layer of a receiver, data are transferred through the physical channel. The physical channel is modulated using an orthogonal frequency division multiplexing (OFDM) scheme, and utilizes time and frequency as a radio resource.

A function of the MAC layer includes mapping between a logical channel and a transport channel and multiplexing/de-multiplexing on a transport block provided to a physical channel over a transport channel of a MAC service data unit (SDU) belonging to the logical channel. The MAC layer provides a service to a radio link control (RLC) layer through the logical channel.

A function of the RLC layer includes RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel, and the physical channel in association with configuration, reconfiguration and release of radio bearers (RBs).

An RB is a logical path provided by the first layer (i.e., the PHY layer) and the second layer (i.e., the MAC layer, the RLC layer, and the PDCP layer) for data delivery between the UE and the network. The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the network, the UE is in an RRC connected state, and otherwise the UE is in an RRC idle state.

Data is transmitted from the network to the UE through a downlink transport channel. Examples of the downlink transport channel include a broadcast channel (BCH) for transmitting system information and a downlink-shared channel (SCH) for transmitting user traffic or control messages. The user traffic of downlink multicast or broadcast services or the control messages can be transmitted on the downlink-SCH or an additional downlink multicast channel (MCH). Data are transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Figure 4:
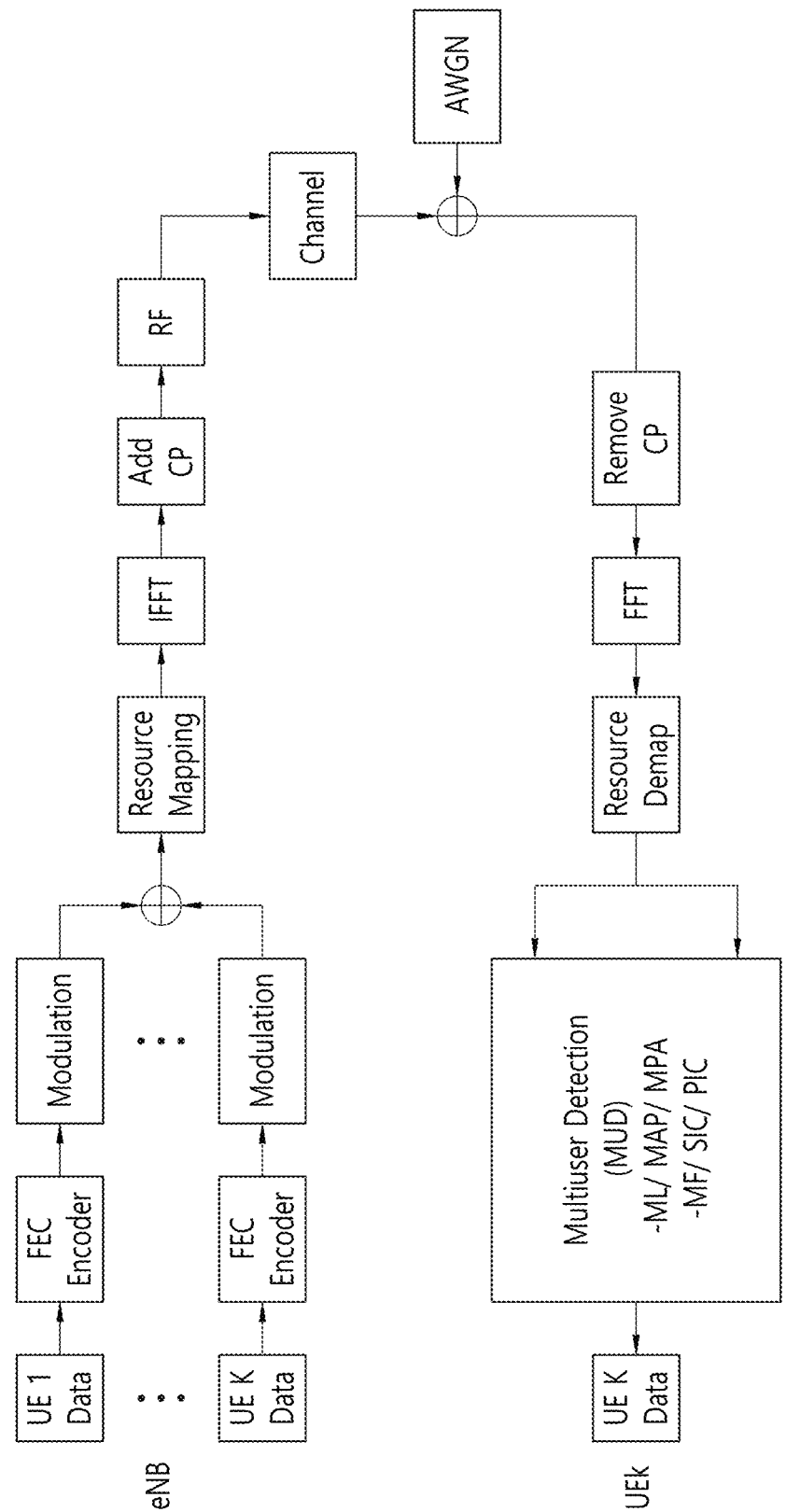
FIG. 4 is a block diagram illustrating NOMA based downlink transmission/reception (Tx/Rx) of a communication apparatus.

FIG. 4 is a block diagram illustrating NOMA based downlink transmission/reception (Tx/Rx) of a communication apparatus.

In a Non-orthogonal Coded Multiple Access (NCMA) scheme for transmitting multi-UE (or multi-user) information by allocating the multi-UE information to the same resource, a transmitter and receiver structure for downlink support as shown in FIG. 4 is general. The NOMA system may be referred to as Multiuser Superposition Transmission (MUST) in the 3GPP standardization task. The NOMA system is considered as the element technology of the next generation 5G system intended to obtain transmission capacity gain or increase the number of simultaneous accesses as compared with the LTE system by transmitting information for a plurality of UEs to the same time-frequency resource through superposition. Examples of the NOMA based technology of the next generation 5G system include MUST for identifying UEs based on a power level, Sparse Code Multiple Access (SCMA) that uses sparse complex codebook based modulation, and interleave division multiple access (IDMA) that uses a user-specific interleaver.

In case of the MUST system, the transmitter of FIG. 4 varies power allocation of each symbol after modulation of multi-UE data or transmits the multi-UE data by hierarchically modulating the multi-UE data based on hierarchical modulation, and the receiver demodulates the data of the multi-UE (hereinafter, referred to as multi-UE data) through multi-UE detection (or multiuser detection) (MUD).

In case of the SCMA system, the transmitter of FIG. 4 replaces a modulation procedure of a forward error correction (FEC) encoder and modulation procedure for multi-UE data with a sparse complex codebook modulation scheme which is previously scheduled, and the receiver demodulates the multi-UE data through MUD.

In case of the IDMA system, the transmitter of FIG. 4 modulates FEC encoding information for multi-UE data through a UE-specific interleaver, and the receiver demodulates the multi-UE data through MUD.

Each system may demodulate the multi-UE data in various MUD schemes. Examples of the various MUD schemes include Maximum Likelihood (ML), Maximum joint A posteriori Probability (MAP), Message Passing Algorithm (MPA), Matched Filtering (MF), Successive Interference Cancellation (SIC), Parallel Interference Cancellation (PIC), and Codeword Interference Cancellation (CWIC). There may be a difference in demodulation complexity and processing time delay in accordance with each demodulation scheme or each demodulation attempt.

Figure 5:
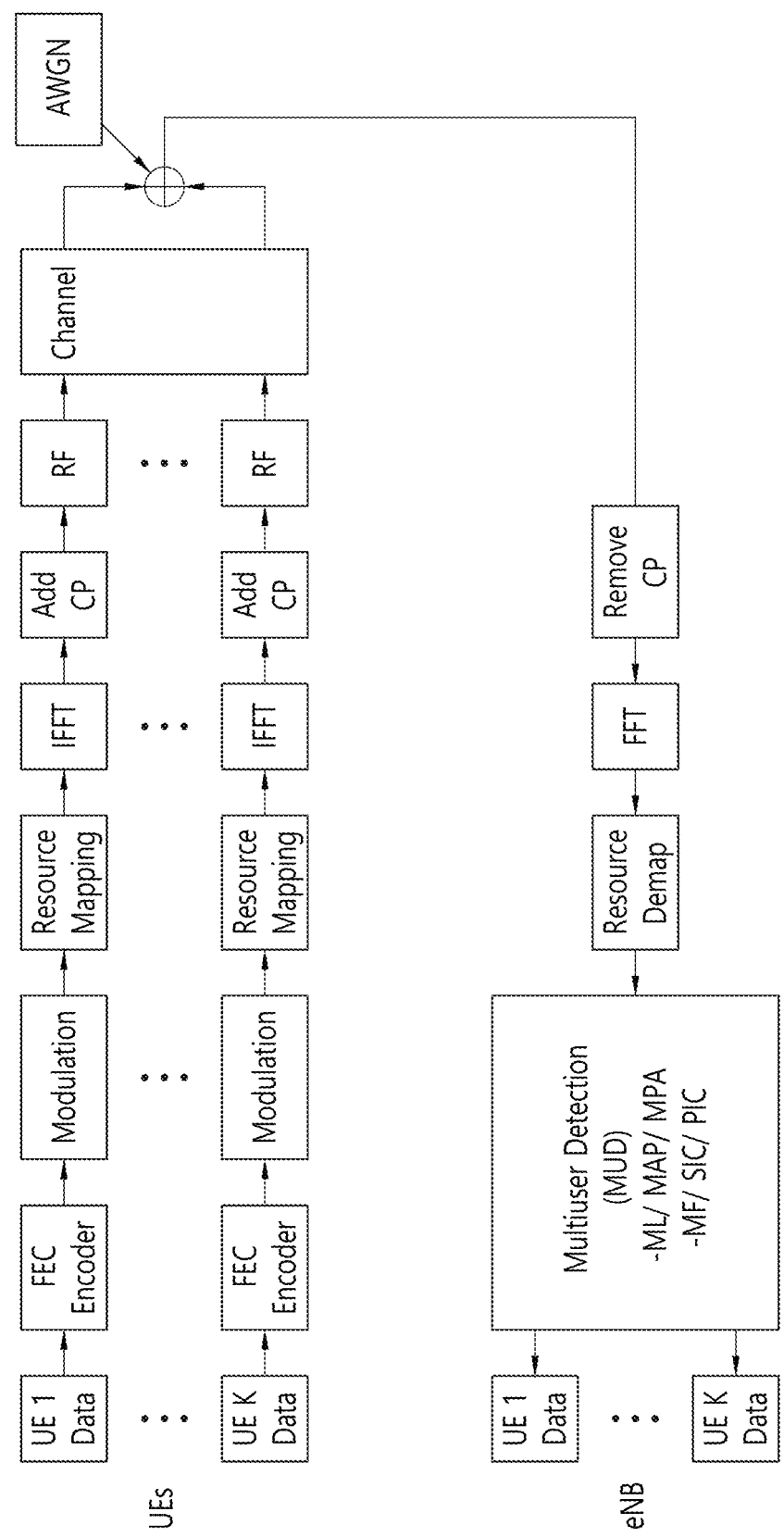
FIG. 5 is a block diagram illustrating NOMA based uplink transmission/reception (Tx/Rx) of a communication apparatus.

FIG. 5 is a block diagram illustrating NOMA based uplink transmission/reception (Tx/Rx) of a communication apparatus.

A transmitter and receiver structure for uplink support of the NOMA based system that transmits information of multi-UE (hereinafter, referred to as multi-UE information) by allocating the multi-UE information to the same resource is shown in FIG. 5. Each system may transmit multi-UE data in the same manner as the description of the downlink structure of FIG. 4 and modulate the multi-UE data through the receiver. Since the NOMA based systems transmit multi-UE signals to the same time-frequency resource through superposition, the systems have a higher decoding error rate as compared with the LTE system but may support higher frequency usage efficiency or more massive connectivity. The NOMA systems may achieve higher frequency usage efficiency or more massive connectivity while maintaining a decoding error through coding rate control in accordance with a system environment.

Since the NOMA based systems allocate data of multi-UEs to the same resource, interference of multi-UE data is necessarily generated as compared with allocation of single-UE data. A signal of the kth receiver in the NOMA based system of FIG. 4 is simply expressed as illustrated in the following Equation 1.

$$y_k = \sum_{n=1}^{K} h_k s_n + n_k = h_k s_k + \sum_{n \neq k, n=1}^{K} h_k s_n + n_k \quad \text{[Equation 1]}$$

In this case, $h_k$ means a channel from the transmitter to the kth receiver, $s_k$ means a data symbol to the kth receiver, and $n_k$ means signal noise. K is the number of multiple UEs allocated to the same time-frequency resource.

The second term $$\sum_{n \neq k, n=1}^{K} h_k s_n$$

of the third formula of the Equation 1 indicates multiuser interference (MUI) signal according to a data symbol to another receiver. Therefore, transmission capacity according to the received signal is simply expressed as illustrated in the following Equation 2.

$$C = \sum_{\lambda i=1}^{K} R_k \quad \text{[Equation 2]}$$

-continued $$R_k = \log_2\left(1 + \frac{|h_k s_k|^2}{\left|\sum_{n\neq k, n=1}^{K} h_s s_n\right|^2 + \sigma_k}\right) =$$

$$\log_2\left(1 + \frac{\text{Channel Gain}}{MUI + \text{Noise}}\right), \forall k$$

In transmission capacity of the above Equation 2, the number of Rk added in accordance with increase of K may be increased, whereby increase of C may be expected. However, each Rk may be reduced due to increase of MUI in accordance with increase of K, entire transmission capacity C may be reduced. In accordance with the MUD scheme, even though data of each UE may be demodulated while MUI is being effectively reduced, the presence of MUI reduces entire transmission capacity and requires MUD of high complexity. If MUI occurrence of data transmission of the multi-UE is minimized, higher transmission capacity may be expected. Alternatively, if MUI occurrence for data transmission of the multi-UE may be controlled quantitatively, higher transmission capacity may be planned by scheduling of data superposition of the multi-UE. Therefore, the development of multi-UE access technology that may control MUI according to data superposition transmission of the multi-UE is required. The development of multi-UE access technology that may control MUI generated during data superposition transmission of the multi-UE to the same time-frequency resource is required.

Therefore, the present invention suggests a non-orthogonal coded multiple access (NCMA) that minimizes multi-UE interference of the next generation 5G system.

Figure 6:
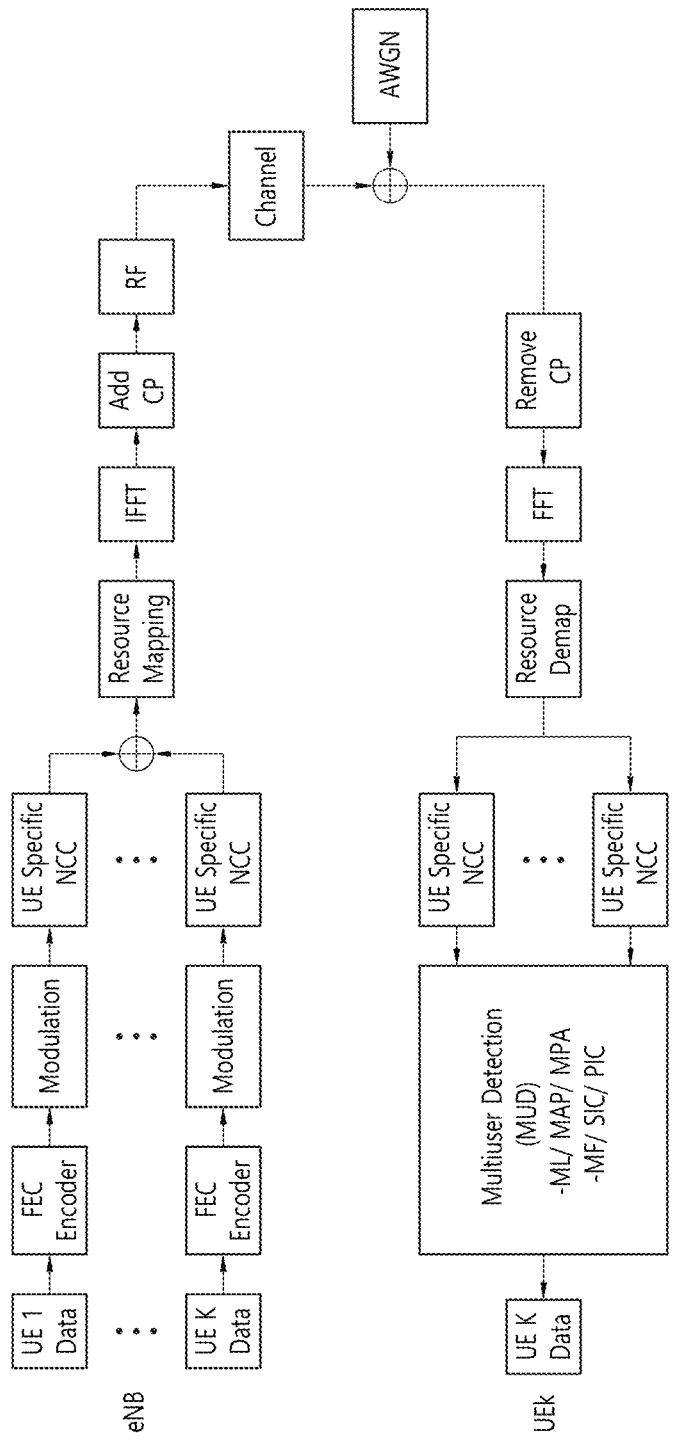
FIG. 6 is a block diagram illustrating NCMA based downlink transmission/reception (Tx/Rx) of a communication apparatus.
Figure 7:
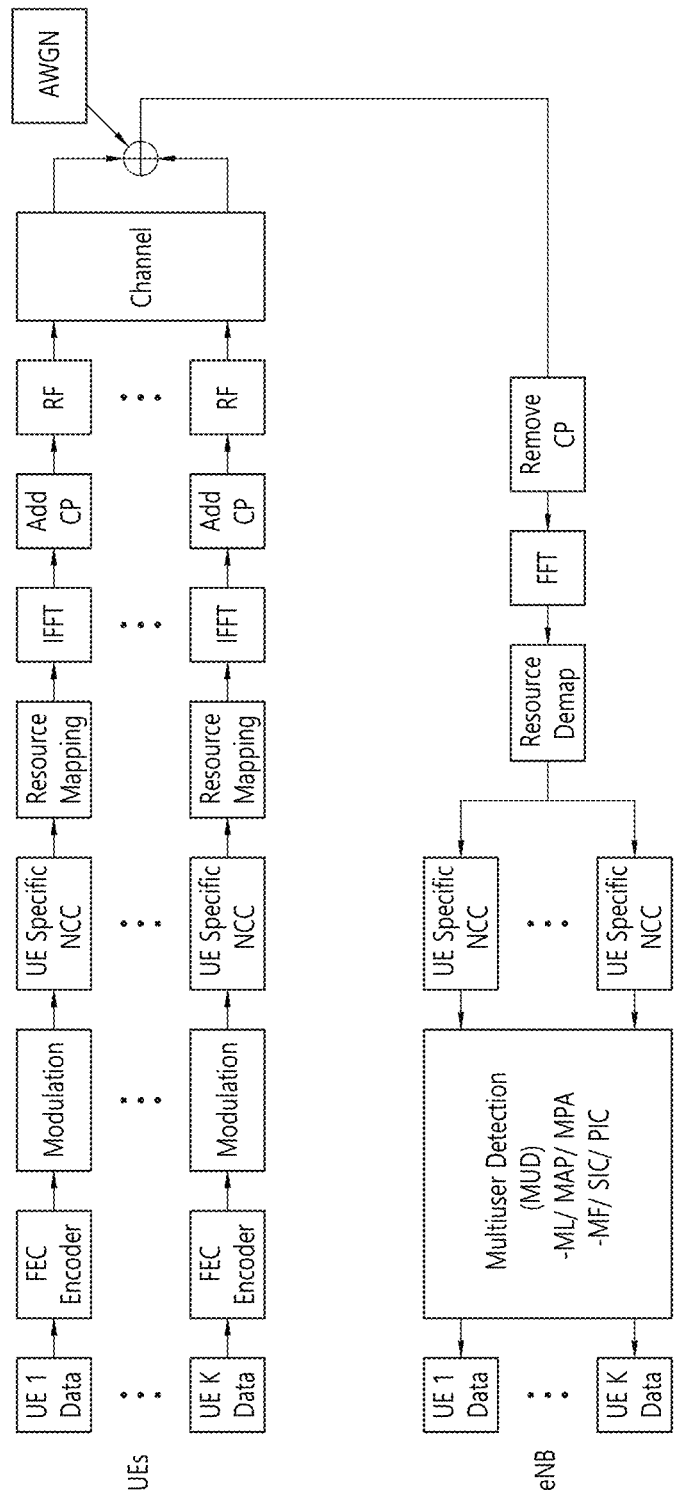
FIG. 7 is a block diagram illustrating NCMA based uplink transmission/reception (Tx/Rx) of a communication apparatus.

FIG. 6 is a block diagram illustrating NCMA based downlink transmission/reception (Tx/Rx) of a communication apparatus, and FIG. 7 is a block diagram illustrating NCMA based uplink transmission/reception (Tx/Rx) of a communication apparatus.

The present invention suggests an NCMA scheme that minimizes multi-UE interference when data of multi-UE are transmitted to the same time-frequency resource through superposition. FIGS. 6 and 7 illustrate downlink and uplink transmitter and receiver structures of the NCMA system that performs superposition transmission by using UE-specific non-orthogonal code cover (NCC) when multi-UE information is allocated to the same time-frequency resource. The transmitter/receiver (or transmitting side/receiving side) allocates UE-specific NCC to each UE by using a non-orthogonal codebook which is previously defined.

The codeword mentioned in the present invention means a complex element vector selected by (or allocated to) each UE to perform non-orthogonal multiple access. The codebook means a set of codewords used by each UE to perform non-orthogonal multiple access. The codebook mentioned as above may exist as a plurality of codebooks. The UE-specific NCC means that the complex element vector of the codebook selected by (or allocated to) each UE is used for a symbol to be transmitted. Therefore, the NCC (or UE-specific NCC) may be expressed as codebook index and codeword index. The non-orthogonal codebook is expressed as illustrated in the following Equation 3.

$$C = [c^{(1)} \ \ldots \ c^{(K)}] = \begin{bmatrix} c_1^{(1)} & \ldots & c_1^{(K)} \\ \vdots & \ddots & \vdots \\ c_N^{(1)} & \ldots & c_N^{(K)} \end{bmatrix} \quad [\text{Equation 3}]$$

In the above Equation 3, $c^{(j)}$ is a codeword for the jth UE, and a codeword set for a total of K UEs becomes a codebook C. Use of $c^{(j)}$ for data transmission of the jth UE is defined as NCC. Also, the codebook may be expressed as a vector length N of the codeword and the number K of codewords. In this case, N means a spreading factor, and K means a superposition factor. For convenience of description, although one codeword is used for one UE, a plurality of codewords may be used by one UE or one codeword may be used by a plurality of UEs. Also, one or more codewords allocated to one UE may be subjected to hopping of codewords by use of different codewords in the same codebook or use of different codewords in different codebooks in accordance with time or usage frequency.

UE-specific NCC may be allocated by connection with UE ID in RRC connection process, or may be allocated through DCI (downlink control information) format included in a downlink control channel (for example, PDCCH).

In case of an uplink environment used for contention based multiple access (MA), a UE may select non-orthogonal codewords randomly or through connection with UE ID. At this time, UE-specific NCC is not allocated by a base station but directly selected by a UE, whereby NCC contention between multiple UEs may occur. A success rate for identification of multi-UE information is reduced due to MUD if there is contention of NCC in the base station which is a receiver.

The UE-specific NCC may be defined by Grassmannian line packing, and a chordal distance formed by two random vectors in the same subspace is always maintained equally. That is, the chordal distance may be obtained mathematically or algorithmically as a codebook that satisfies $\min_C (\max_{1 \leq k < j \leq K} \sqrt{1 - |c^{(k)*} \cdot c^{(j)}|^2})$, $C \subset \mathbb{C}^{N \times K}$. The UE-specific NCC has features as expressed by the following Equation 4.

$$\begin{cases} |c^{(k)*} \cdot c^{(k)}| = 1, \forall k, k = 1, \ldots, K, & [\text{Equation 4}] \\ \text{if } N > K, |c^{(k)*} \cdot c^{(j)}| = \delta, \forall k, \forall j, k = 1, \ldots, K, j = 1, \ldots, K, \\ \text{if } N \leq K, |c^{(k)*} \cdot c^{(j)}| = 0, \forall k, \forall j, k = 1, \ldots, K, j = 1, \ldots, K. \end{cases}$$

In this case, $c^{(k)*}$ is a conjugate codeword of c(k). The features of the Equation 4 are as listed in the followings (1), (2), and (3).

(1) Multiplication of the same codewords in the transmitter and the receiver is 1.

(2) The chordal distance between a codeword and another codeword in the same codebook is equally maintained.

(3) If N≤K, a codeword is orthogonal to another codeword.

The codebook having the above features is previously scheduled by the transmitter/receiver (or transmitting side/receiving side) to configure UE-specific NCC. In this case, a lower bound of a chordal distance $$\delta_{N,K} \geq \sqrt{1 - \frac{(N-1)K}{N(K-1)}}$$

according to two random codewords is obtained. Therefore, MUI for superposition transmission of multi-UE data is determined by being minimized by the lower bound. Also, since the chordal distance for the two random codewords is always maintained equally, statistical prediction of MUI may be performed by the number of UEs. If the number of UEs is determined, since a decoding error rate of the receiver may be predicted by MUI value, MCS level may be controlled based on interference for multi-UE superimposition transmission. For example, when K codewords are transmitted in (N×1) dimension, if the receiver performs decoding using its codewords, 1 is decoded from its codeword, and statistical interference of $\delta_{N,K}(K-1)$ remains from another K−1 codewords. This value is varied depending on an optimization level of a codebook design. Also, since a difference in a value of $\delta_{N,K}$ exists depending on the optimization level of the codebook design, the number K of superposition UEs or the number N of used resources may be varied depending on Required SINR or target QoS of the communication system, whereby the MUI value may be controlled.

The embodiment of the non-orthogonal codebook is expressed in the form of 3GPP TS 36.211 as listed in that following Tables 1 and 2, and may be used as UE-specific NCC.

Table 1 illustrates a codebook in case of Spreading Factor N=2.

TABLE 1

| # of codewords (Max. # of users: K) | Examples of spreading codebook $[c^{(1)} \ldots c^{(K)}]$ |
|---|---|
| 2 | $\begin{bmatrix} 1 & 1 \\ 1 & -1 \end{bmatrix}$ |
| 3 | $\begin{bmatrix} -0.5078 - 0.2451i & -0.8055 + 0.5684i & -0.1483 - 0.4194i \\ 0.5640 - 0.6034i & 0.1640 + 0.0357i & -0.8751 - 0.1904i \end{bmatrix}$ |
| 4 | $\begin{bmatrix} -0.4907 - 0.7256i & -0.6440 - 0.5906i & -0.1657 + 0.2160i & -0.5775 - 0.2480i \\ 0.4510 + 0.1709i & -0.4452 + 0.1956i & 0.9349 - 0.2279i & -0.3586 - 0.6902i \end{bmatrix}$ |

Table 2 illustrates a codebook in case of Spreading Factor N=4.

TABLE 2

| # of codewords (Max. # of users: K) | Examples of spreading codebook $[c^{(1)} \ldots c^{(K)}]$ |
|---|---|
| 4 | $\begin{bmatrix} 1 & 1 & 1 & 1 \\ 1 & 1 & 1 & 1 \\ 1 & 1 & -1 & -1 \\ 1 & -1 & -1 & 1 \end{bmatrix}$ |
| 6 | $\begin{bmatrix} \iota - 0.0557 - 0.4476i & -0.1684 - 0.8131i & -0.0149 - 0.2205i & \ldots \\ & -0.0198 - 0.1206i & -0.3294 - 0.3689i & -0.0487 + 0.4145i \\ 0.4023 - 0.1460i & -0.4021 + 0.2118i & -0.6703 + 0.0282i & \ldots \\ & -0.6521 - 0.4251i & -0.0729 - 0.0903i & -0.2158 - 0.3003i \\ -01499 - 0.3961i & 0.0471 - 0.2647i & 0.3131 - 0.5204i & \ldots \\ & -0.5576 - 0.0206i & 0.6726 - 0.0552i & 0.0357 + 0.0924i \\ 0.5675 + 0.3346i & -0.0866 + 0.1557i & -0.0287 + 0.3624i & \ldots \\ & -0.0286 + 0.2589i & 0.4567 - 0.2792i & 0.6985 + 0.4372i \end{bmatrix}$ |
| 8 | $\begin{bmatrix} -0.2381 - 0.8369i & -0.6599 - 0.1222i & -0.6557 - 0.1776i & -1561 + 0.9861i & \ldots \\ & -0.1374 + 0.1275i & -0.1849 + 0.3859i & -0.2426 - 0.2248i & -0.1703 - 0.0604i \\ -0.2593 - 0.3320i & 0.4906 + 0.0221i & 0.3934 + 0.2749i & -0.3453 - 0.2068i & \ldots \\ & -0.5596 + 0.0272i & 0.0616 + 0.0315i & -0.3027 - 0.3133i & -0.7664 + 0.1256i \\ -0.1249 + 0.0320i & 0.0425 + 0.3856i & 0.0440 - 0.3295i & -0.3979 + 0.0525i & \ldots \\ & -0.5272 - 0.2195i & 0.0649 - 0.8770i & -0.2452 + 0.4427i & -0.0149 - 0.4727i \\ -0.2080 - 0.0342i & 0.3968 - 0.0250i & -0.3444 - 0.2811i & -0.7817 - 0.1845i & \ldots \\ & 0.2417 + 0.5162i & 0.3955 - 0.0203i & 0.4625 - 0.4805i & 0.0794 - 0.3663i \end{bmatrix}$ |

Various values may be obtained using mathematical equation or algorithm in addition to the above Tables 1 and 2.

Figure 8:
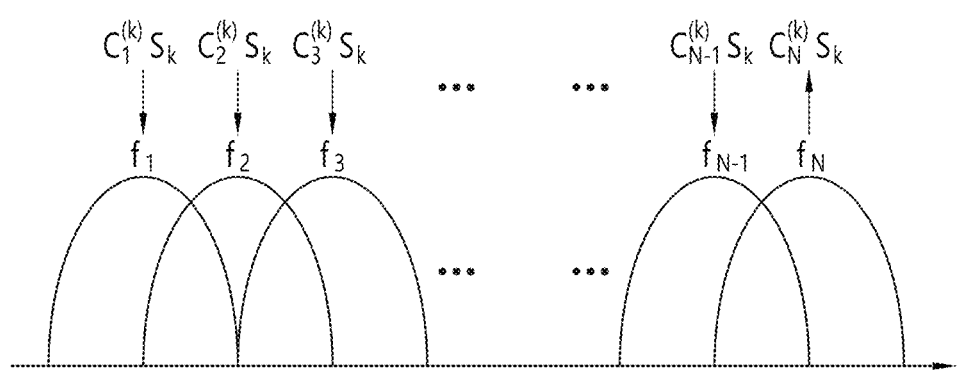
FIG. 8 is a conceptual diagram illustrating a frequency axis of data transmission according to UE-specific NCC.

FIG. 8 is a conceptual diagram illustrating a frequency axis of data transmission according to UE-specific NCC.

FIG. 8 illustrates a concept that a transmitter (or transmitting side) transmits kth UE data on a frequency axis through UE-specific NCC. When UE-specific NCC defined by Grassmaniann line packing is previously scheduled by the transmitter and the receiver, data for the kth UE is multiplied by a codeword corresponding to the kth UE. At this time, one data symbol sk corresponds to a codeword vector $c^{(k)}$ of (N×1) dimension. Then, N elements of the codeword correspond to N subcarriers.

That is, in FIG. 8, since one data symbol is transmitted to N subcarriers, the same time-frequency resource efficiency is reduced to 1/N as compared with the legacy LTE system. On the other hand, if N or more symbols are transmitted by superposition, time-frequency resource efficiency is increased as compared with the LTE system. For example, if K symbols are transmitted by superposition in case of N<K, frequency resource efficiency is increased as much as K/N times.

Figure 9:
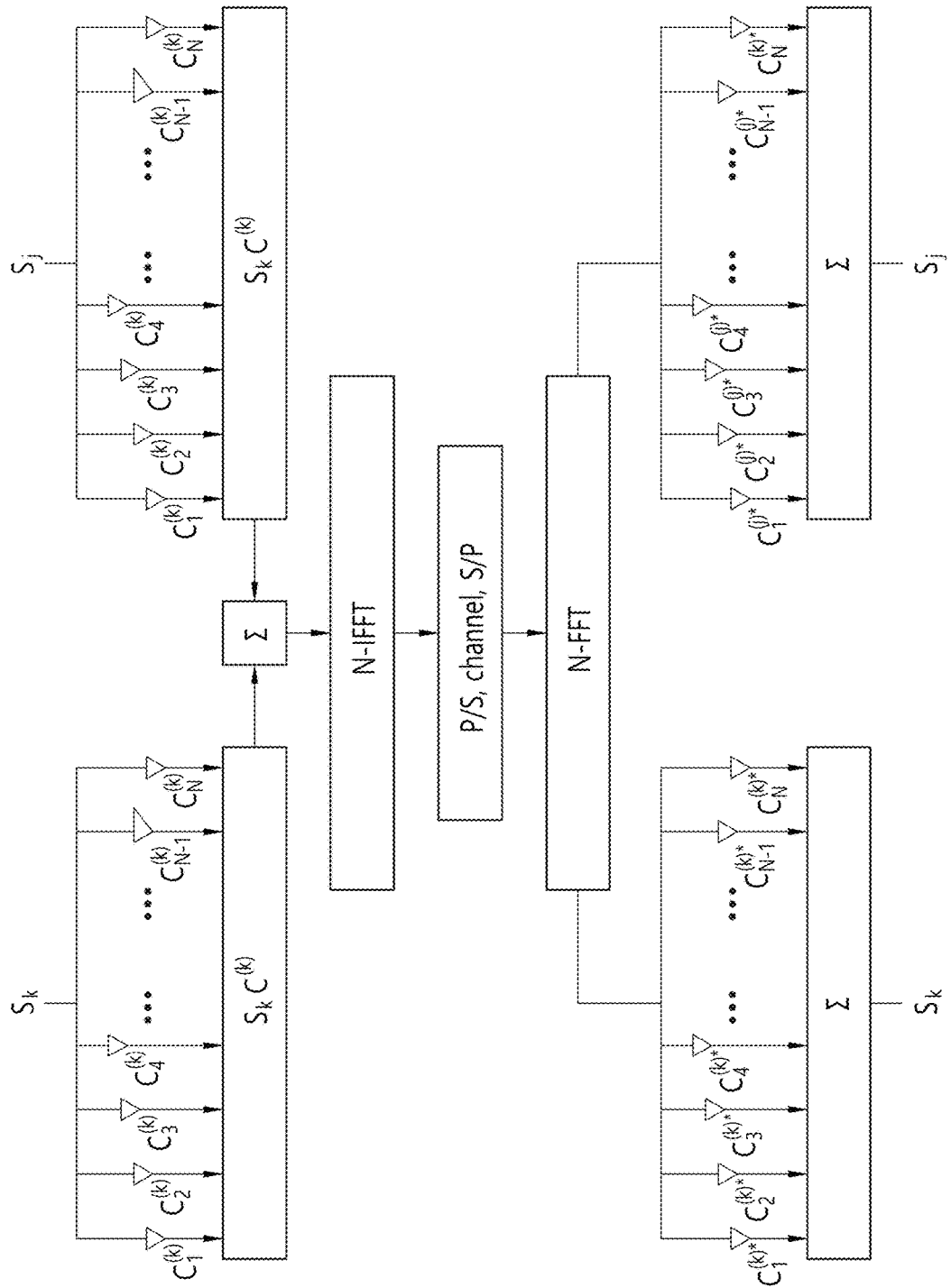
FIG. 9 is a structural diagram illustrating basic transmission and reception of NCMA system.

FIG. 9 is a structural diagram illustrating basic transmission and reception of NCMA system.

FIG. 9 is a basic transmission and reception structural view of NCMA system that uses UE-specific NCC. Data symbols for each UE are converted to UE-specific NCC corresponding to each UE and superposed in the transmitter. A frequency axis signal of a superposed N length is converted to a time-axis signal through N-IFFT, whereby OFDM transmission is performed, and the receiver restores the time-axis signal to a frequency-axis signal through N-FFT. The restored frequency-axis signal decodes each UE data symbol using a conjugate codeword of UE-specific NCC corresponding to each UE. The decoded $s_k$ may include MUI depending on the number of superposed UEs, and exact $s_k$ decoding is available through MUD. At this time, the length of the frequency-axis signal converted in accordance with UE-specific NCC which is previously defined may be shorter than N. For example, if two frequency-axis signal vectors converted to UE-specific NCC of N/2 length are connected in series to form N length, it will be apparent that demodulation is available in the receiver even in case of N-FFT.

In case of downlink, a detection equation for data decoding in the kth UE receiver is expressed as illustrated in the following Equation 5.

$$y_k = \sum_{n=1}^{K} H_k c^{(n)} s_n + n_k,$$ [Equation 5]

$$y_k = \left[ \frac{[y_k]_j}{[H_k]_{j,j}} \right]_{j=1,\ldots,N} = \sum_{n=1}^{K} c^{(n)} s_n + \hat{n}_k,$$

In the above Equation 5, $H_k$ means (N×N) channel matrix from the kth transmitter to the receiver, and includes frequency-axis channel coefficients as a diagonal matrix. $c^{(k)}$ is (N×1) UE-specific NCC vector for the receiver at the kth transmitter, $s_k$ is a data symbol to the kth receiver, and n means (N×1) signal noise vector. K is the number of multi-UEs allocated to the same time-frequency resource. In this case, $$\left[ \frac{[A]_j}{[B]_{j,j}} \right]_{j=1,\ldots,N}$$

means division of the jth element of vector A and the jth diagonal element of matrix B. If the vector A is a diagonal matrix, the vector A means element division of diagonal matrixes.

A signal of desired codewords and noise remain through channel compensation in the above Equation 5, and are detected as expressed by the following Equation 6 through conjugate codeword of UE-specific NCC of the receiver.

$$\tilde{y}_k = c^{(k)*} \cdot \hat{y}_k$$ [Equation 6]

$$= c^{(k)*} \cdot c^{(k)} s_k + \sum_{n \neq k, n=1}^{K} c^{(k)*} \cdot c^{(n)} s_n + \tilde{n}_k,$$

$$= s_k + \sum_{n \neq k, n=1}^{K} c^{(k)*} \cdot c^{(n)} \cdot s_n + \tilde{n}_k.$$

In the above Equation 6, the second item of the last column indicates MUI, and may be removed or reduced through the MUD scheme.

In case of uplink, a detection equation for data decoding in the receiver of the base station is expressed as illustrated in the following Equation 7.

$$y = \sum_{n=1}^{K} H_n c^{(n)} s_n + n = H_k c^{(k)} s_k + \sum_{n \neq k, n=1}^{K} H_n c^{(n)} s_n + n,$$ [Equation 7]

The second term of the third formula of the Equation 7 indicates multi-UE interference signal MUI according to a data symbol to another receiver. A detection equation of the receiver for data decoding of the kth UE is expressed as illustrated in the following Equation 8.

$$\hat{y}_k = \left[ \frac{[y]_j}{[H_k]_{j,j}} \right]_{j=1,\ldots,N} =$$ [Equation 8]

$$c^{(k)} s_k + \sum_{n=1}^{K} \left[ \frac{[H_n]_{j,j}}{[H_k]_{j,j}} \right]_{j=1,\ldots,N} c^{(n)} s_n + \hat{n},$$

A signal of desired codewords, MUI, and noise remain through channel compensation for the kth UE data, and are detected as expressed by the following Equation 9 through conjugate codeword of UE-specific NCC of the receiver.

$$\tilde{y}_k = c^{(k)*} \cdot \hat{y}_k$$ [Equation 9]

$$= c^{(k)*} \cdot c^{(k)} s_k + \sum_{n \neq k, n=1}^{K} c^{(k)*} \cdot \left[ \frac{[H_n]_{j,j}}{[H_k]_{j,j}} \right]_{j=1,\ldots,N} c^{(n)} s_n + \tilde{n},$$

$$= s_k + \sum_{n \neq k, n=1}^{K} c^{(k)*} \cdot \left[ \frac{[H_n]_{j,j}}{[H_k]_{j,j}} \right]_{j=1,\ldots,N} c^{(n)} \cdot s_n + \tilde{n}.$$

In the above Equation 9, the second item of the last column indicates MUI, and may be removed or reduced through the MUD scheme. At this time, frequency-axis channel change of $$\left[\frac{[H_n]_{j,j}}{[H_k]_{j,j}}\right]_{j=1,\ldots,N}$$

causes a change of MUI value when MUD according to UE-specific NCC is performed due to a change of a channel environment from the multi-UE. For convenience of description, a single transmitting and receiving antennas is provided, it will be apparent that the same scheme is applied to even an environment where multiple antennas are used.

According to the description related to the aforementioned NCMA scheme, it is possible to achieve higher frequency usage efficiency or more massive connectivity in accordance with the number of superposed UEs while controlling MUI according to multi-UE data superposition transmission.

In addition, the present specification proposes a signaling procedure for the aforementioned NCMA. Specifically, the present specification proposes a signaling method and a codebook information exchanging scheme for performing the NCMA.

Figure 10:
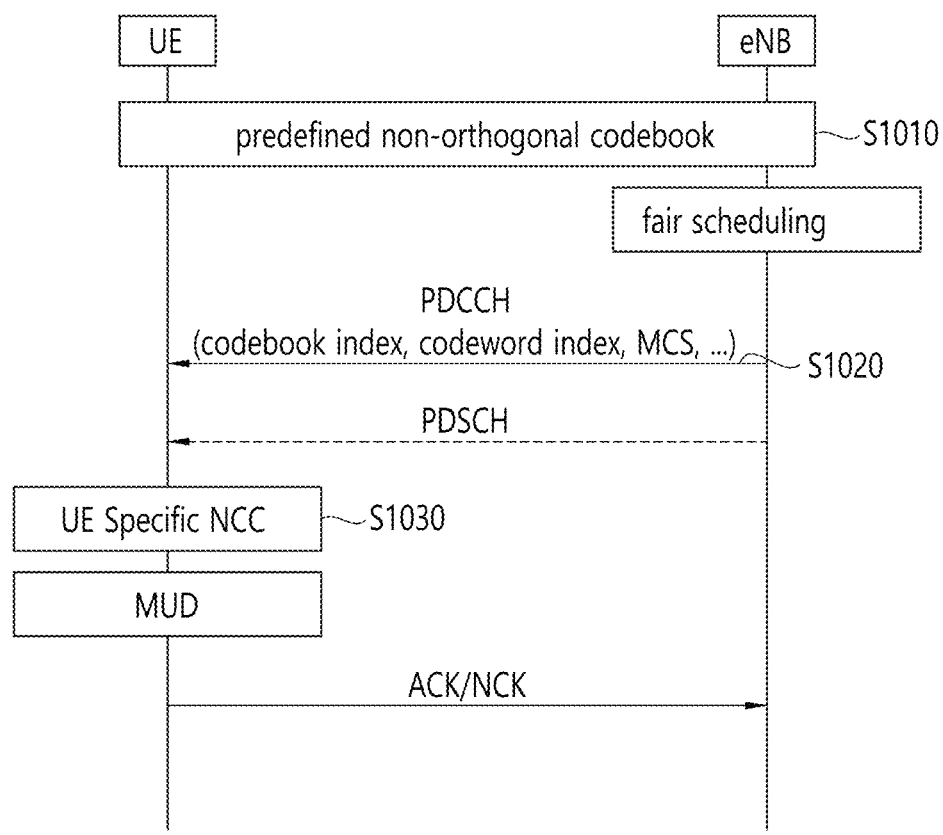
FIG. 10 is a flowchart showing a signaling procedure of a downlink NCMA system.
Figure 11:
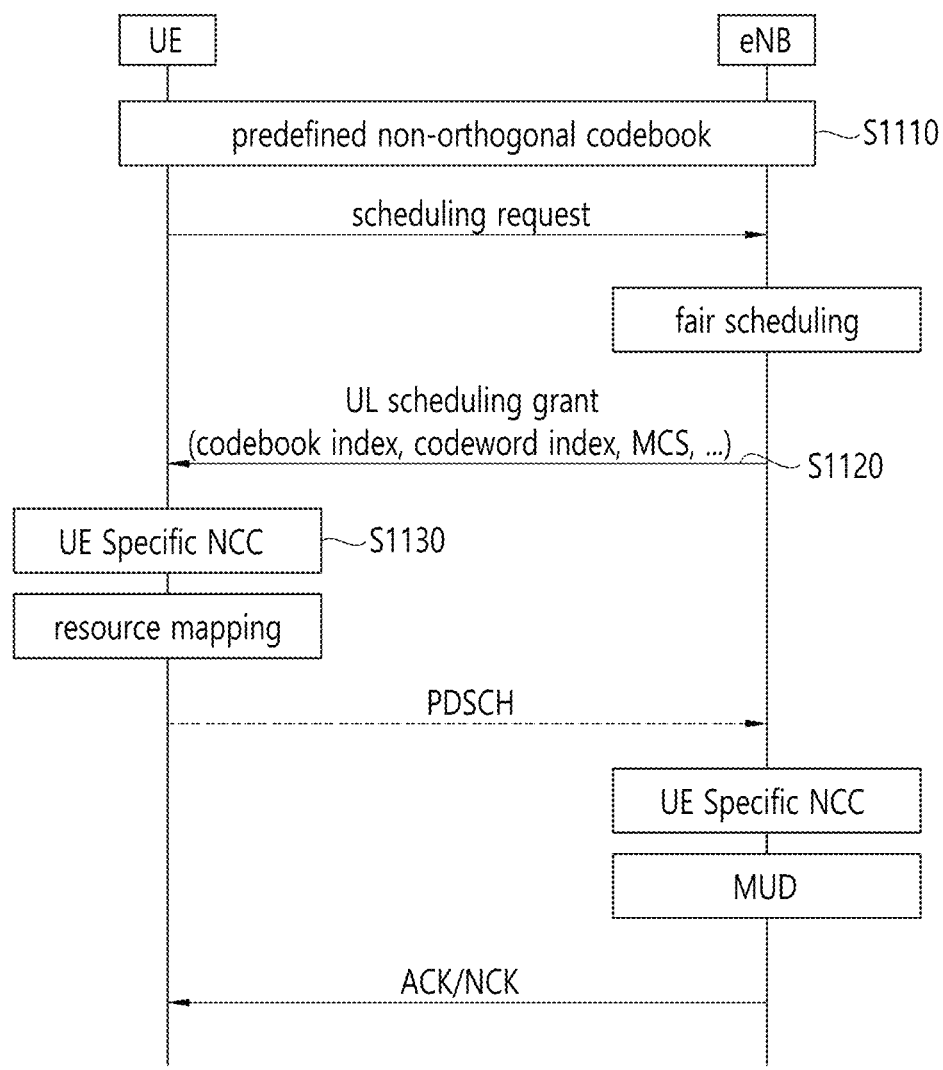
FIG. 11 is a flowchart showing a signaling procedure of an uplink NCMA system.

FIG. 10 is a flowchart showing a signaling procedure of a downlink NCMA system. FIG. 11 is a flowchart showing a signaling procedure of an uplink NCMA system.

Referring to FIG. 10 and FIG. 11, a user (or UE) and an eNB have pre-defined non-orthogonal codebook information (S1010, S1110). In this case, there may be various ways of having the pre-defined non-orthogonal codebook information.

For example, it is possible to have the non-orthogonal codebook information as shown in the following cases (1) and (2).

(1) When G(N, K) denotes an (N×K)-dimensional codebook defined by Grassmannian line packing, it is stored for each of N and K.

(2) It has a basis vector of an (N×1)-dimensional codeword constituting G(N, K).

Index information on the basis vectors or the non-orthogonal codebooks defined in the aforementioned method is defined as a codebook index. Upon generation of a DL or UL information transmission request, a codebook index corresponding to a UE-specific NCC to be used by each user and a codebook index inside a corresponding codebook are transmitted to the user as control information through fairness scheduling of the eNB (S1020, S1120). That is, the NCC (codebook index, codeword index) for each user is transmitted according to a scheduling scheme. The user uses the UE-specific NCC in modulation or demodulation through the received codebook index and codeword index (S1030, S1130). In this case, if a scheme for a pre-defined codebook corresponds to the case (1) above, the stored codebook is directly used. If the scheme for the pre-defined codebook corresponds to the case (2) above, the eNB and the user generate and use G(N, K) based on the stored basis vector. In this case, the number of codewords allocated to each user may be 1, or may be at least 2. That is, in case of a user requiring a high data rate, two or more symbols are simultaneously transmitted through two or more codewords, and thus it is apparent that two or more symbols can be demodulated in a receiving side. In addition, N and K which determine a codebook dimension are changeable according to a system environment. If K is equal to or less than N, a codebook G(N, N) is used. The codebook G(N, N) is an orthonormal codebook.

According to the determined G(N, K), a chordal distance between the codewords may be defined as described above, and may be defined as MUI. The eNB is capable of resource management based on the MUI value in fairness scheduling, and determines an MCS level through a demodulation error rate based on the MUI value. The fairness scheduling may be performed based on the determined MCS level.

Although the present specification has been described based on downlink and uplink of a cellular system, apparently, it is also applicable to all systems using a multiple user access scheme such as Machine Type Communication (MTC), Device-to-Device (D2D), Vehicle-to-Everything (V2X), or the like.

In the legacy LTE, as a multiple access scheme, an orthogonal frequency division multiple access (OFDMA) scheme and a single carrier frequency division multiple access (SC-FDMA) scheme have been representatively considered. In particular, the SC-FDMA considered in the uplink is often referred to as Discrete Fourier Transform Spread OFDM (DFT-s OFDM) in terms of each user. In the DFT-s OFDM, one symbol is spread to multiple subcarriers and transmitted, thereby reducing a peak power of a time domain signal after IFFT, and as a result, a gain may be achieved in the PAPR performance. On the contrary, the DFT-s OFDM may be vulnerable to a reflected wave by multiple paths, which may lead to reduction of decoding performance of a receiver. However, in the uplink, since PAPR exerts an importance influence on system coverage, power consumption of the UE, etc., the PAPR is considered as an important metric.

In the 5G NR (New RAT), a spreading based MA that allocates and transmits multi-user information to the same resource is considered as a multi-access scheme, and a scheme is assumed, in which multi-user data is superimposed on the same time/frequency resource and transmitted through a spreading scheme. FIGS. 6 and 7 illustrate downlink and uplink transmitter/receiver structures of a spreading based multiple access system that superimposes and transmits multi-user information by using a UE-specific spreading code at the time of allocating the multi user information to the same time/frequency resource. In FIGS. 6 and 7, the UE-specific spreading code is used on a frequency axis, but may be used on a time axis. In a UE-specific code of the spreading based multiple access scheme, a codebook which is a set of codes used in all users who are superimposed may have an orthogonal characteristic or a non-orthogonal characteristic. When the codebook has the non-orthogonal characteristic, the spreading based multiple access scheme may be classified into a technology of Non-orthogonal Multiple Access (NoMA). Multiuser Detection (MUD) may operate for multi-user decoding at the receiver and various receiving algorithms may operate based on the spreading codes used at the transmitter (for example, ML, MAP, MPA, MF, SIC, PIC, etc.).

However, massive machine type communication (mMTC) among the systems considered in 5G NR requires wide cell coverage and high connectivity. On the other hand, a terminal of mMTC may employ a low-cost terminal such as a sensor and in this case, a battery problem and a low-cost Power Amp (PA) may be employed. In this case, a Peak-to-Average Power Ratio (PAPR) may act as a very important metric, and as a result, an uplink transmission technique for reducing the PAPR is required. Accordingly, the present specification intends to propose a spreading based MA scheme for reducing the PAPR.

Figure 12:
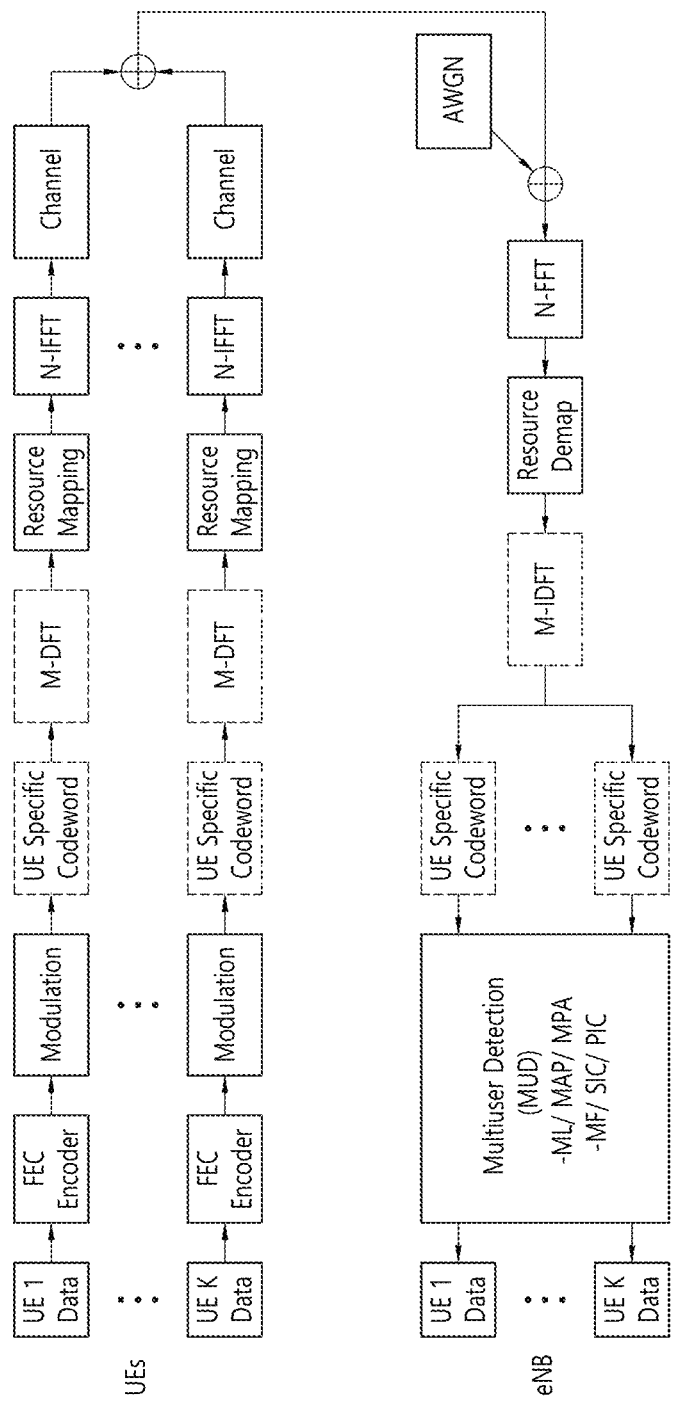
FIG. 12 is a diagram illustrating an uplink transmission/reception block diagram using a spread-based multiple access scheme to which DFT spreading is applied according to the present embodiment.

FIG. 12 is a diagram illustrating an uplink transmission/reception block diagram using a spread-based multiple access scheme to which DFT spreading is applied according to the present embodiment.

The present invention proposes a spreading based multiple access scheme for reducing the PAPR. When DFT spreading is applied to the spreading based multiple access scheme in order to reduce the PAPR, the spreading based multiple access scheme may be shown as illustrated in FIG. 12. Each user may use a UE-specific codeword or codebook and will be described below for convenience of description.

FIG. 12 illustrates a transmission/reception block diagram of an uplink environment when DFT spreading is applied to a spreading based multiple access scheme. Each user uses a different UE-specific codeword for spreading, and the spread signal is again spread over multiple subcarriers via an M-sized DFT (M-DFT). An N-sized IFFT (N-IFFT) is performed through resource mapping of spread subcarriers, and a time domain signal is generated and transmitted through a channel. A receiver (eNB) performs an M-sized IDFT (M-IDFT) via an N-sized FFT (N-FFT) and resource mapping. Then, the receiver performs MUD by despreading based on the UE-specific codeword.

When a DFT block exists between the spreading code block using the UE-specific codeword and the IFFT block, the spreading code is applied to a frequency domain signal. This is not much different from the conventional OFDMA based scheme and has the effect of NoMA as it is.

When the DFT block precedes the spreading code block using the UE-specific codeword, the spreading code is applied to the time domain signal acquired by the DFT block. When the DFT block and the spreading code block are arranged as described above, the PAPR may be reduced.

In this case, since each user uses a different UE-specific codeword, a PAPR characteristic at each transmitter may vary depending on a codeword characteristic. For example, the spreading code is configured in a Hadamard matrix as follows.

$$H_1 = [1], H_2 = \begin{bmatrix} 1 & 1 \\ 1 & -1 \end{bmatrix}, \quad \text{[Equation 10]}$$

$$H_{2N} = \begin{bmatrix} H_N & H_N \\ H_N & -H_N^T \end{bmatrix}$$

That is, when a spreading factor is 2, two UE-specific codewords may be generated through two column vectors. In the same scheme, as the spreading factor increases, the number of superimposed multi-users may increase. The scheme may guarantee orthogonality in the spreading codeword and may be thus called Orthogonal Coded MA (OCMA). In this case, PAPR characteristics shown in FIGS. 13 to 15 are shown.

Figure 13:
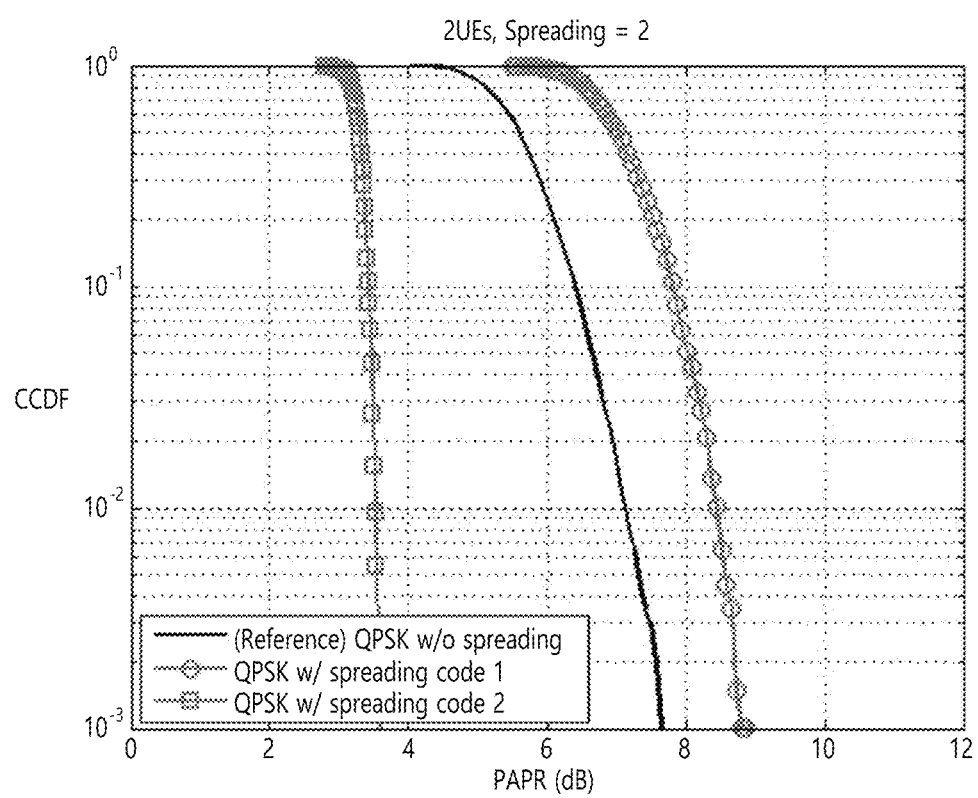
FIG. 13 is a diagram illustrating a comparison of PAPRs of a transmitter adopting QPSK modulation and using a spreading-based multiple access scheme for each codeword according to the present embodiment.
Figure 14:
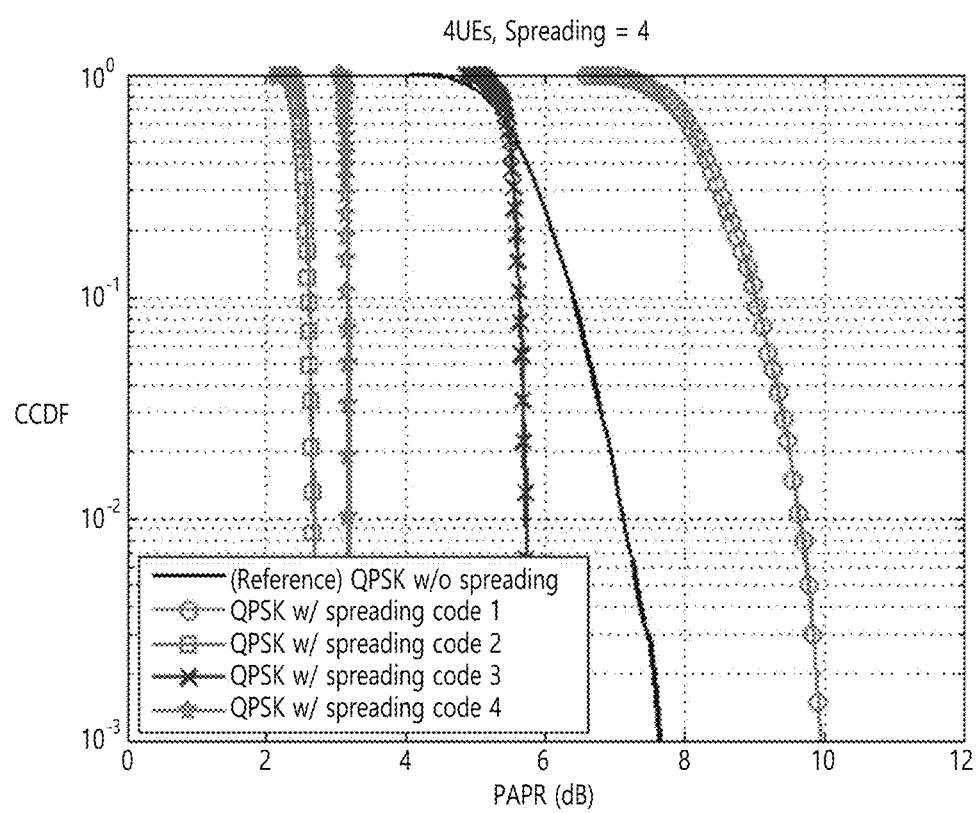
FIG. 14 is a diagram illustrating a comparison of PAPRs of a transmitter adopting QPSK modulation and using a spreading-based multiple access scheme for each codeword according to the present embodiment.
Figure 15:
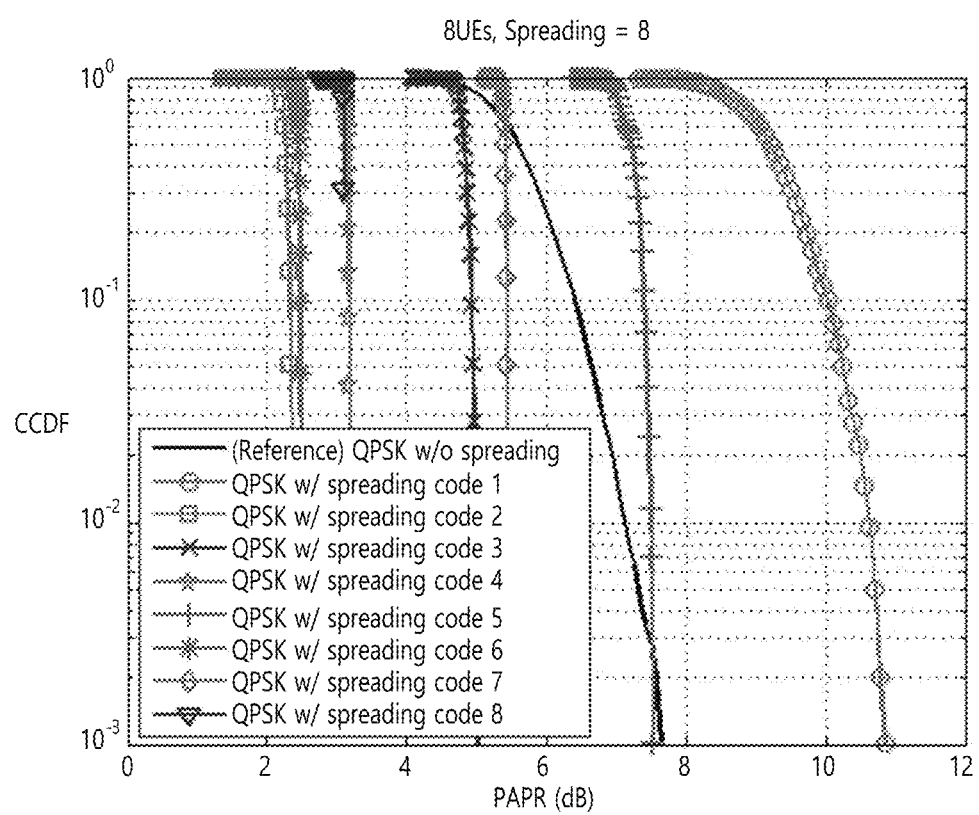
FIG. 15 is a diagram illustrating a comparison of PAPRs of a transmitter adopting QPSK modulation and using a spreading-based multiple access scheme for each codeword according to the present embodiment.

FIGS. 13 to 15 are diagrams for comparing PAPRs of a transmitter adopting QPSK modulation and using a spreading-based multiple access scheme for each codeword according to the present embodiment.

FIGS. 13 to 15 illustrate graphs illustrating a comparison of PAPR characteristics of a transmitter for each codeword for superimposing transmission spreading to a codeword (hereinafter, referred to as Hadamard Codeword) configured in a Hadamard matrix when QPSK modulation is applied. In particular, FIG. 13 illustrates a PAPR in the case of using two spreading codewords when the spreading factor is 2. FIG. 14 illustrates a PAPR in the case of using four spreading codewords when the spreading factor is 4. FIG. 15 illustrates a PAPR in the case of using eight spreading codewords when the spreading factor is 8.

A PAPR measurement environment is a situation where an allocated bandwidth (M)=120 subcarriers, a system bandwidth (N)=1024 subcarriers, and localized resource mapping is performed. A reference curve is a QPSK environment (QPSK without spreading) of DFT-s OFDM without spreading and in the reference curve, a PAPR of approximately 7.1 dB is obtained at 10^(−2) for Complementary Cumulative Distribution Function (CCDF). As seen in FIGS. 13 to 15, different PAPRs may be identified according to the spreading code.

Referring to FIG. 13, the transmitter may generate the UE-specific codeword by using a column vector of $H_2$ because the spreading factor is 2. When the spreading code is 1, the UE-specific codeword may be generated as a first column vector $$\begin{bmatrix} 1 \\ 1 \end{bmatrix}$$

of $H_2$ and when the spreading code is 2, the UE-specific codeword may be generated as a second column vector $$\begin{bmatrix} 1 \\ -1 \end{bmatrix}$$

of $H_2$. In respect to a curve for the spreading code of 1, it can be seen that since $$\begin{bmatrix} 1 \\ 1 \end{bmatrix}$$

is used, the PAPR increases while a shape of the reference curve is almost maintained. In respect to a curve for the spreading code of 2, it can be seen that since $$\begin{bmatrix} 1 \\ -1 \end{bmatrix}$$

is used, the effect of phase inversion in a shifted state is obtained and a magnitude of the sum of the column vectors decreases, so that the PAPR decreases. That is, when the spreading code is configured in the Hadamard matrix, half of all spreading codes roughly have a PAPR value that is higher than a reference PAPR (PAPR in a non-spreading environment) and the other half roughly has a lower PAPR value than the reference PAPR. This may be similarly applied even to FIGS. 14 and 15.

Figure 16:
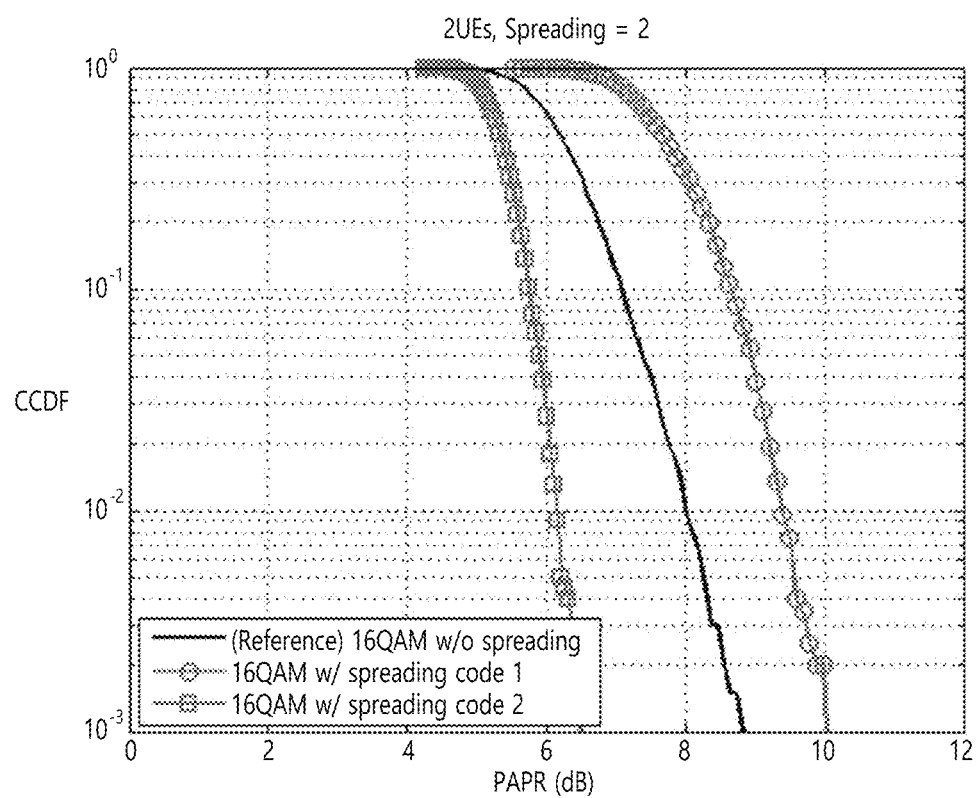
FIG. 16 is a diagram illustrating a comparison of PAPRs of a transmitter adopting 16QAM modulation and using a spreading-based multiple access scheme for each codeword according to the present embodiment.

FIG. 16 is a diagram illustrating a comparison of PAPRs of a transmitter adopting 16QAM modulation and using a spreading-based multiple access scheme for each codeword according to the present embodiment.

Figure 17:
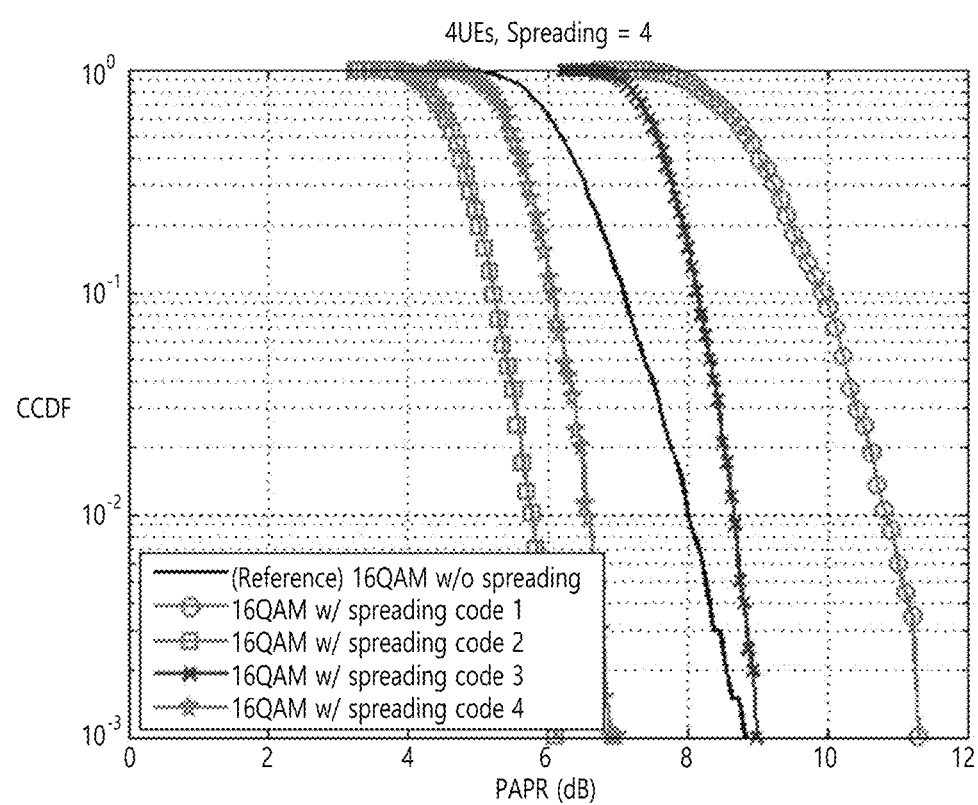
FIG. 17 is a diagram illustrating a comparison of PAPRs of a transmitter adopting 16QAM modulation and using a spreading-based multiple access scheme for each codeword according to the present embodiment.
Figure 18:
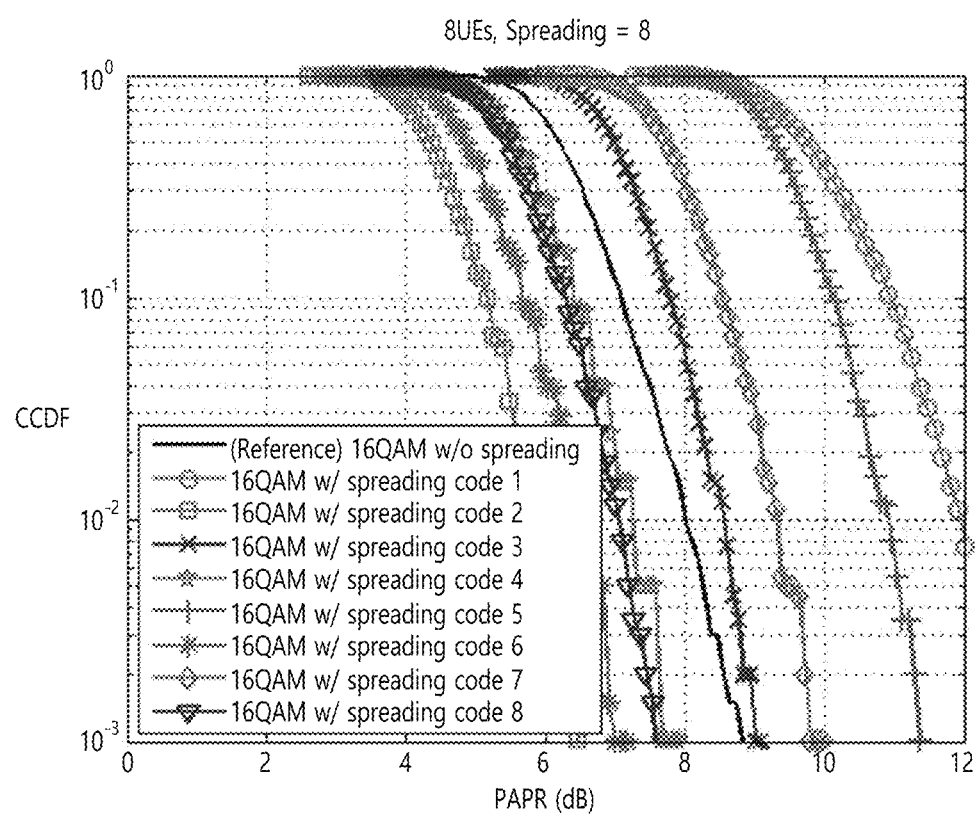
FIG. 18 is a diagram illustrating a comparison of PAPRs of a transmitter adopting 16QAM modulation and using a spreading-based multiple access scheme for each codeword according to the present embodiment.

FIGS. 16 to 18 illustrate graphs illustrating a comparison of PAPR characteristics of a transmitter for each codeword for superimposing transmission spreading to a Hadamard Codeword when 16QAM modulation is applied. In particular, FIG. 16 illustrates a PAPR in the case of using two spreading codewords when the spreading factor is 2. FIG. 17 illustrates a PAPR in the case of using four spreading codewords when the spreading factor is 4. FIG. 18 illustrates a PAPR in the case of using eight spreading codewords when the spreading factor is 8.

A PAPR measurement environment is a situation where an allocated bandwidth (M)=120 subcarriers, a system bandwidth (N)=1024 subcarriers, and localized resource mapping is performed. A reference curve is a 16QAM environment (16QAM without spreading) of DFT-s OFDM without spreading and in the reference curve, a PAPR of approximately 8 dB is obtained at 10^(-2) for Complementary Cumulative Distribution Function (CCDF). As seen in FIGS. 16 to 18, different PAPRs may be identified according to the spreading code.

Referring to FIG. 16, the transmitter may generate the UE-specific codeword by using a column vector of $H_2$ because the spreading factor is 2. When the spreading code is 1, the UE-specific codeword may be generated as a first column vector $$\begin{bmatrix} 1 \\ 1 \end{bmatrix}$$

of $H_2$ and when the spreading code is 2, the UE-specific codeword may be generated as a second column vector $$\begin{bmatrix} 1 \\ -1 \end{bmatrix}$$

of $H_2$. In respect to a curve for the spreading code of 1, it can be seen that since $$\begin{bmatrix} 1 \\ 1 \end{bmatrix}$$

is used, the PAPR increases while a shape of the reference curve is almost maintained. In respect to a curve for the spreading code of 2, it can be seen that since $$\begin{bmatrix} 1 \\ -1 \end{bmatrix}$$

is used, the effect of phase inversion in a shifted state is obtained and a magnitude of the sum of the column vectors decreases, so that the PAPR decreases. That is, when the spreading code is configured in the Hadamard matrix, half of all spreading codes roughly have a PAPR value that is higher than a reference PAPR (PAPR in a non-spreading environment) and the other half roughly has a lower PAPR value than the reference PAPR. This may be similarly applied even to FIGS. 17 and 18.

Figure 19:
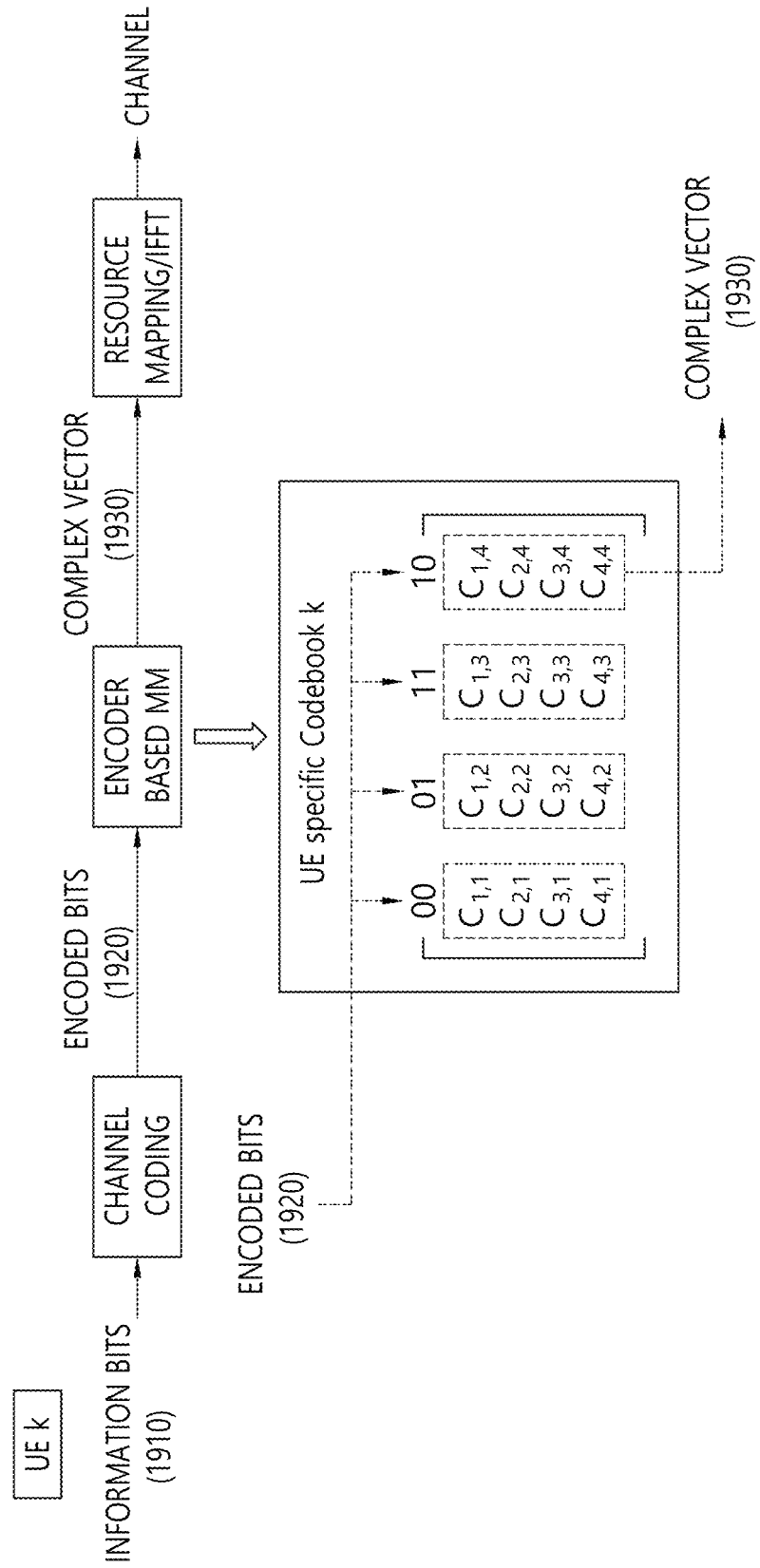
FIG. 19 is a diagram illustrating one example of a NOMA operation of a transmitter adopting multi-dimensional modulation (MM) according to the embodiment.

FIG. 19 is a diagram illustrating one example of a NOMA operation of a transmitter adopting multi-dimensional modulation (MM) according to the embodiment.

Of the spreading based multiple access techniques, a NoMA technique based on Multi-dimensional Modulation (MM) also performs encoding based on the UE-specific codeword (or codebook) and adopts spreading. An operation of multi-dimensional modulation based NoMA may be illustrated like FIG. 19.

Referring to FIG. 19, in a k-th UE performing uplink transmission, an information bitstream 1910 by generated traffic is generated and converted into a bitstream 1920 encoded by channel coding. Then, bits encoded by a multi-dimensional modulation-based encoder is converted into a complex vector (1930) based on UE-specific codebook (or codeword) k. In the example of FIG. 19, it can be seen that 2-bit encoded bits are converted into a complex vector constituted by four complex symbols. For example, when the encoded bits are [0 0], the encoded bits are converted into complex vector $[c_{1,1}, c_{2,1}, c_{3,1}, c_{4,1}]T$. When the encoded bits are [0 1], the encoded bits are converted into complex vector $[c_{1,2}, c_{2,2}, c_{3,2}, c_{4,2}]^T$. When the encoded bits are [1 1], the encoded bits are converted into complex vector $[c_{1,3}, c_{2,3}, c_{3,3}, c_{4,3}]^T$. When the encoded bits are [1 0], the encoded bits are converted into complex vector $[c_{1,4}, c_{2,4}, c_{3,4}, c_{4,4}]^T$.

The converted complex vector is IFFT and transmitted via resource mapping. The operation is similarly applied even to a downlink transmission operation and the receiver decodes the complex vector into the encoded bits through MUD such as Message Passing Algorithm (MPA), etc. It is assumed that each user uses a codebook shown in a table below with respect to the multi-dimensional modulation based encoder.

TABLE 3

| UE index k | UE specific Codebook k = | 00 [vec 1 | 01 vec 2 | 10 vec 3 | 11 vec 4] * $P_{no}$ |
|---|---|---|---|---|---|
| UE 1 | $\begin{bmatrix} 0 & 0 & 0 & 0 \\ -1*e^{j*\frac{2}{3}\pi} & 3*e^{j*\frac{2}{3}\pi} & -3*e^{j*\frac{2}{3}\pi} & 1*e^{j*\frac{2}{3}\pi} \\ 0 & 0 & 0 & 0 \\ -3 & -1 & 1 & 3 \end{bmatrix} * P_{no}$ | | | | |
| UE 2 | $\begin{bmatrix} -3 & -1 & 1 & 3 \\ 0 & 0 & 0 & 0 \\ -1*e^{j*\frac{2}{3}\pi} & 3*e^{j*\frac{2}{3}\pi} & -3*e^{j*\frac{2}{3}\pi} & 1*e^{j*\frac{2}{3}\pi} \\ 0 & 0 & 0 & 0 \end{bmatrix} * P_{no}$ | | | | |
| UE3 | $\begin{bmatrix} -1*e^{j*\frac{2}{3}\pi} & 3*e^{j*\frac{2}{3}\pi} & -3*e^{j*\frac{2}{3}\pi} & 1*e^{j*\frac{2}{3}\pi} \\ -3 & -1 & 1 & 3 \\ 0 & 0 & 0 & 0 \\ 0 & 0 & 0 & 0 \end{bmatrix} * P_{no}$ | | | | |
| UE 4 | $\begin{bmatrix} 0 & 0 & 0 & 0 \\ 0 & 0 & 0 & 0 \\ -3*e^{j*\frac{1}{3}\pi} & -1*e^{j*\frac{1}{3}\pi} & 1*e^{j*\frac{1}{3}\pi} & 3*e^{j*\frac{1}{3}\pi} \\ -1*e^{j*\frac{2}{3}\pi} & 3*e^{j*\frac{2}{3}\pi} & -3*e^{j*\frac{2}{3}\pi} & 1*e^{j*\frac{2}{3}\pi} \end{bmatrix} * P_{no}$ | | | | |
| UE 5 | $\begin{bmatrix} -1*e^{j*\frac{2}{3}\pi} & 3*e^{j*\frac{2}{3}\pi} & -3*e^{j*\frac{2}{3}\pi} & 1*e^{j*\frac{2}{3}\pi} \\ 0 & 0 & 0 & 0 \\ 0 & 0 & 0 & 0 \\ -3*e^{j*\frac{1}{3}\pi} & -1*e^{j*\frac{1}{3}\pi} & 1*e^{j*\frac{1}{3}\pi} & 3*e^{j*\frac{1}{3}\pi} \end{bmatrix} * P_{no}$ | | | | |
| UE 6 | $\begin{bmatrix} 0 & 0 & 0 & 0 \\ -1*e^{j*\frac{1}{3}\pi} & 3*e^{j*\frac{1}{3}\pi} & -3*e^{j*\frac{1}{3}\pi} & 1*e^{j*\frac{1}{3}\pi} \\ -3 & -1 & 1 & 3 \\ 0 & 0 & 0 & \square \end{bmatrix} * P_{no}$ | | | | |

Here, $P_{no}$ represents a normalized matrix (M×M) for (M×M) power restriction. $P_{no}$ is expressed by an equation as follows.

$$P_{no} = \begin{bmatrix} P_{no,1} & 0 & 0 & 0 \\ 0 & P_{no,2} & 0 & 0 \\ 0 & 0 & P_{no,3} & 0 \\ 0 & 0 & 0 & P_{no,4} \end{bmatrix}. \quad \text{[Equation 11]}$$

In this case, $P_{no,on}=(1/|\text{vec } m|)\times\sqrt{K}$, for m=1, ..., M, where K=4, M=4.

Through the scheme, a modulation scheme adopts multi-dimensional modulation (MM) of M=4 instead of QPSK. In this case, the PAPR depending on the UE-specific codebook may be obtained as illustrated in FIG. 20.

Figure 20:
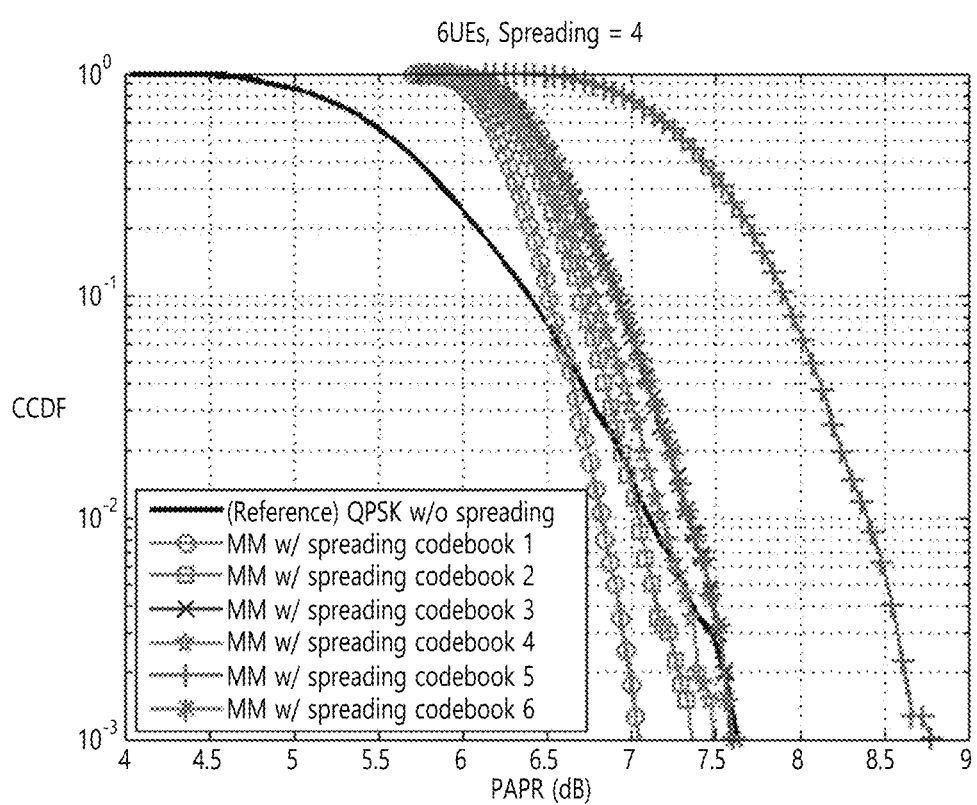
FIG. 20 is a diagram illustrating a comparison of PAPRs of a transmitter adopting multi-dimensional modulation and using a spreading-based multiple access scheme for each codeword according to the present embodiment.

FIG. 20 is a diagram illustrating a comparison of PAPRs of a transmitter adopting multi-dimensional modulation (MM) and using a spreading based multiple access scheme for each codeword according to the present embodiment.

FIG. 20 is a graph illustrating a comparison of PAPR characteristics of a transmitter for each UE-specific codebook for superposing transmission spreading to a multi-dimensional modulation based encoder when M=4, spreading factor=4, and the number of UEs is 6. A PAPR measurement environment is a situation where an allocated bandwidth (M)=120 subcarriers, a system bandwidth (N)=1024 subcarriers, and localized resource mapping is performed. A reference curve is a QPSK environment (QPSK without spreading) of DFT-s OFDM without spreading and in the reference curve, a PAPR of approximately 7.1 dB is obtained at 10^(−2) for CCDF. As seen in FIG. 20, it may be identified that different PAPRs are obtained according to the UE-specific codebook.

A difference of the PAPR of the transmitter may be identified according to the UE-specific codeword or the UE-specific codebook of the spreading based multiple access through FIGS. 13 to 15, FIGS. 16 to 18, and FIG. 20. A specific codeword or codebook has a better PAPR than a reference system, while another specific codeword or codebook has a worse PAPR than the reference system. In a multi-user superimposing access scheme, since multi-users perform simultaneous transmission through the UE-specific codeword or UE-specific codebook of each user in the same time/frequency resource, in-cell geometries of the users may be diversified. In respect to the PAPR, when uplink transmission is performed at an outside of the cell, it is more important to perform the uplink transmission at the center of the cell. A user who performs the uplink transmission at the center of the cell may perform transmission with lower power in terms of power control for decoding at the receiver. On the contrary, a user who performs the uplink transmission at the outside of the cell may require larger power so as to overcome propagation loss in terms of the power control for decoding at the receiver. However, since there is a maximum transmit power constraint of the UE, there is a limit to increase power in terms of energy efficiency. Further, the PAPR may be a very important metric depending on Power Amp (PA) performance of the transmitter. Accordingly, for the user at the outside of the cell, a system having a low PAPR is advantageous.

Based on the characteristics, proposed is a system in which the user at the outside of the cell uses, selects, or is allocated the UE-specific codeword or the UE-specific codebook having the low PAPR and the user at the center of the cell uses, selects, or is allocated the UE-specific codeword or the UE-specific codebook having a high PAPR. A system which uses, selects, or is allocated the UE-specific codeword or the UE-specific codebook depending on the PAPR characteristic may have the following characteristic.

First, in all examples to be described below, it is assumed spreading code indexes are aligned in an ascending order according to the PAPR (for example, spreading code index 1 corresponds to a codeword index having a lowest PAPR).

Further, in all examples to be described below, a geometry class is grouped according to the position of the UE in the cell and defined or assumed and it is assumed that the indexes of the geometry class are aligned in the ascending order to the inside from the outside of the cell (for example, geometry class index 1 corresponds to a group index of a user positioned at an outermost periphery in the cell).

Figure 21:
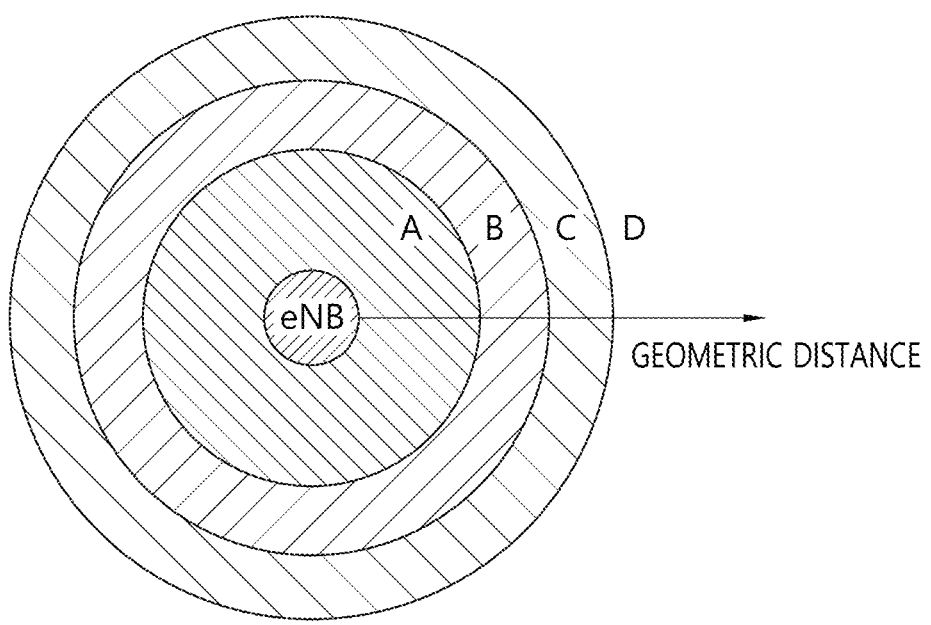
FIG. 21 is a diagram illustrating one example of a region where a UE may exist according to a distance from a base station according to the present embodiment.

FIG. 21 is a diagram illustrating one example of a region where a UE may exist according to a distance from a base station according to the present embodiment.

Referring to FIG. 21, if regions A, B, C, and D in which the UE may exist may be defined according to the distance from the base station (or an eNB/gNB) and geometric classes are defined as four groups, the geometry class of a UE existing in a region of D may be 1, the geometry class of a UE existing in a region of C may be 2, the geometry class of a UE existing in a region of B may be 3, and the geometry class of a UE existing in a region of A may be 4. The geometry class may be defined by a method (a method such as GPS, Localization, etc.) that may recognize the position and defined by a magnitude (a method such as Reference Signal Received Power (RSRP), Received Signal Strength Indication (RSSI) measurement, etc.) of a signal. Further, the geometry class may be defined by a different method according to a system environment may be promised by the UE and the base station.

In the following description, a spreading based multiple access scheme for the reducing the PAPR according to three uplink transmission schemes is proposed.

1. Contention Based Transmission

In a first embodiment, the UE may select the geometry class based on DL received power (measured based on reference signals, synchronization signals, broadcasting channels, etc.) via a DL control channel or a DL broadcast channel. A class specific codeword or codebook is to be used for spreading is selected based on the selected geometry class to perform contention based uplink transmission.

The spreading code may be selected at the time of performing the contention based transmission of the UE by a look up table for geometry classes and spreading codes which are promised in advance. That is, the UE may select the spreading code by using the look up table below.

TABLE 4

| Received Power from DL link (Pr) | Geometry Class | Spreading Code Index (Class specific Codeword or Codebook Index) |
|---|---|---|
| Pr < Threshold 1 | 1 | 1 |
| Threshold 1 <= Pr < Threshold 2 | 2 | 2 |
| Threshold 2 <= Pr < Threshold 3 | 3 | 3 |
| Threshold 3 <= Pr < Threshold 4 | 4 | 4 |

TABLE 4-continued

| Received Power from DL link (Pr) | Geometry Class | Spreading Code Index (Class specific Codeword or Codebook Index) |
|---|---|---|
| Threshold 4 <= Pr < Threshold 5 | 5 | 5 |
| Threshold 5 <= Pr | 6 | 6 |

Threshold 1 to Threshold 5 may be dynamically determined by the system environment or may be information that is pre-defined offline or online and shared by the base station and the UE. The look up table of Table 4 above may not have uniqueness and the look up table is changed through update or multiple look up tables exist, and as a result, one look up table may be dynamically selected and operated. A method in which the look up table is shared by the base station and the UE may be summarized as follows.

The look up table is pre-defined offline

The look up table is transmitted through a control channel or a broadcast channel in an RRC step The look up table is transmitted through a periodic control channel, or broadcast channel While multiple various look up tables are pre-defined offline, the look up table index is transmitted through the control channel or broadcast channel in the RRC step While multiple various look up tables are pre-defined in the RRC step, the look up table index is transmitted through the periodic control channel or broadcast channel In the above description, the control channel or the broadcast channel may be a higher layer signal such as RRC signaling, etc.

In the example of Table 4 above, it is assumed that when a total of 6 spreading codes exist, each spreading code is mapped to the class specific codeword or codebook. Here, when the index is 1, the class specific codeword or codebook may have the lowest PAPR and when the index is 6, the class specific codeword or codebook may have the highest PAPR.

Further, the geometry class and the spreading code may have a 1:1 mapping relationship as described above and a 1:M or M:1 mapping relationship. Here, M is an integer larger than 1.

An example of a case where the geometry class and the spreading code have the 1:M mapping relationship is as follows.

TABLE 5

| Received Power from DL link (Pr) | Geometry Class | Spreading Code Index (Class specific Codeword or Codebook Index) |
|---|---|---|
| Pr < Threshold 1 | 1 | 1, 2 |
| Threshold 1 <= Pr < Threshold 2 | 2 | 3, 4 |
| Threshold 2 <= Pr | 3 | 5, 6 |

An example of a case where the geometry class and the spreading code have the M:1 mapping relationship is as follows.

TABLE 6

| Received Power from DL link (Pr) | Geometry Class | Spreading Code Index (Class specific Codeword or Codebook Index) |
|---|---|---|
| Pr < Threshold 1 | 1, 2 | 1 |
| Threshold 1 <= Pr < Threshold 2 | 3 | 2 |
| Threshold 2 <= Pr | 4, 5, 6 | 3 |

In a second embodiment, the UE may request the spreading code index to the base station in an initial access process (e.g., a random access, RRC connection, etc.) based on DL received power (measurement based on the reference signal, the synchronization signal, the broadcasting channel, etc.) through the DL control channel or broadcast channel or UL received power (transmission of a reference signal, a synchronization signal, etc., of the UE) in terms of the base station. The base station allocates the spreading code index to the UE by dividing the geometry class based on the DL received power or the UL received power to indicate the UE-specific codeword or codebook/group specific codeword or codebook through the control channel or DL data. In this case, the base station may indicate the codeword or codebook and indicate only the codeword index or codebook index based on the pre-defined codebook.

Even in the second embodiment, the geometry class and the spreading code index may be mapped 1:1, 1:M, and M:1 as described in the first embodiment.

In a third embodiment, in the cases of the first and second embodiments, when the geometry class is changed by mobility of the UE, the UE may perform reselection or reallocation of the geometry class or the spreading code index by event triggering.

Alternatively, the base station detest a change in geometry class based on the DL received power or the UL received power and performs reselection or reallocation of the geometry class or spreading code index to indicate the corresponding codeword or codebook index to the UE.

In a fourth embodiment, when there are many users with the same spreading code index selected by the selection or reselection of the spreading code index in the case of the first to third embodiments, the base station updates the look up table and broadcasts the updated look up table to reduce a collision probability of the contention based transmission. Then, the UE reselects the spreading code index based on the broadcasted and updated look up table.

In a fifth embodiment, in the case of the first to third embodiments, when there are many users to which the same spreading code index is allocated by allocation or reallocation of the spreading code index, the base station may change the spreading code index of the user to which the same spreading code index is allocated in the related art and reallocate the changed spreading code index over DCI, RRC, or higher layer signals.

In a sixth embodiment, in all cases of the first to fifth embodiments, when the spreading code index is not the UE-specific allocation or selection, UL transmission through the same spreading code may be attempted according to a traffic generation time of each UE for multiple users. In this case, receiver decoding performance by a collision may be reduced. The collision by the user of the same spreading code may be resolved by applying a technique (random back-off, resource hopping, etc.) for reducing the collision of the contention based transmission in the related art or an MUD techniques (DMRS random selection based MUD).

That is, when the UL transmission through the same spreading code is attempted, the technique for the collision reduction, etc., is applied.

2. Semi-Persistent Scheduling (SPS) Based Transmission

In a seventh embodiment, the UE may select the geometry class based on DL received power (measured based on reference signals, synchronization signals, broadcasting channels, etc.) via a DL control channel or broadcast channel. Alternatively, the base station allocates the spreading code index to the UE by dividing the geometry class based on the DL received power or the UL received power to indicate the UE-specific codeword or codebook/group specific codeword or codebook through the control channel or DL data. In this case, the base station may indicate the codeword or codebook and indicate only the codeword index or codebook index based on the pre-defined codebook. The UE may select a class specific codeword or codebook to be used for spreading based on the geometry class or is allocated the class specific codeword or codebook from the base station to perform the semi-persistent scheduling based transmission.

In an eighth embodiment, the spreading code may be selected or the spreading code may be allocated from a base station at the time of SPS-based transmission of the UE, by the look up table of the geometry class and the spreading code which are promised in advance and the methods of all cases of the first to sixth embodiments may be similarly applied.

Further, the geometry class and the spreading code index may be mapped 1:1, 1:M, and M:1 as described in the first embodiment.

In a ninth embodiment, in all cases of the seventh and eighth embodiments, when the spreading code index is not the UE-specific allocation or selection, SPS based UL transmission through the same spreading code may be attempted according to a traffic generation time of each UE for multiple users. In this case, receiver decoding performance by the collision may be reduced. The collision by the user of the same spreading code may be resolved by applying a technique (transmission period change, resource hopping, etc.) for reducing the collision of the SPS based transmission in the related art or the MUD techniques (DMRS random selection based MUD). Of the techniques for reducing the collision of the SPS based transmission, the transmission period change, resource hopping, and the like may be indicated by the base station over the DCI, the RRC, or the higher layer signals.

That is, when the SPS based transmission through the same spreading code is attempted, the technique for the collision reduction, etc., is applied.

3. Scheduling Based Transmission

In a tenth embodiment, the UE may select the geometry class based on DL received power (measured based on reference signals, synchronization signals, broadcasting channels, etc.) via a DL control channel or broadcast channel and reported to the base station. Alternatively, the base station may select the geometry class of each UE based on the DL received power reporting of the UE or the uplink received power measurement of the UE (transmission of the reference signal, synchronization signal, etc, of the UE).

In an eleventh embodiment, the base station may generates the DCI for UL transmission and signal the generated DCI by selecting the geometry class and the class specific codeword or codebook to be used for spreading based on the DL received power reporting or UL received power. In this case, the base station may indicate the codeword or codebook and indicate only the codeword index or codebook index based on the pre-defined codebook.

The geometry class and the spreading code index may be mapped 1:1, 1:M, and M:1 as described in the first embodiment.

The base station may select the geometry class and the class specific codeword or codebook to be used for spreading and transmit control information for the scheduling based UL transmission as the higher layer signal such as the RRC signaling or the DL data.

In a twelfth embodiment, the base station may be tied to the UL power control class or MCS class of the DCI, without direct indication of the codeword or codebook selected by the procedure. In this case, the UE and the base station share the look up table representing the connectivity of the UL power control class or MCS class of the DCI and the spreading code in advance.

That is, the base station configures the UL power control or the MCS class of each UE according to the report of the UE or the UL received power measurement and transmits the UL grant to the UE through the DCI. Upon receiving the UL power control class or the MCS class in the DCI for the UL grant, the UE performs spreading based UL transmission based on the spreading code index tied with the UL power control class or the MCS class as shown in a table below.

TABLE 7

| Report/<br>Measurement<br>of Received<br>Power from<br>DL/UL link (Pr) | UL<br>power<br>Control<br>(or MCS)<br>Class | Spreading<br>Code<br>Index<br>(Class<br>specific<br>Codeword<br>or<br>Codebook<br>Index) |
|---|---|---|
| Pr < Threshold 1 | 1 | 1 |
| Threshold 1 <= Pr < Threshold 2 | 2 | 2 |
| Threshold 2 <= Pr < Threshold 3 | 3 | 3 |
| Threshold 3 <= Pr < Threshold 4 | 4 | 4 |
| Threshold 4 <= Pr < Threshold 5 | 5 | 5 |
| Threshold 5 <= Pr | 6 | 6 |

The UL power control class or the MCS class may be dynamically determined by the system environment or may be information that is pre-defined offline or online and shared by the base station and the UE. The look up table of Table 7 above may not have uniqueness and the look up table is changed through update or multiple look up tables exist, and as a result, one look up table may be dynamically selected and operated. A method in which the look up table is shared by the base station and the UE may be summarized as follows.

The look up table is pre-defined offline

The look up table is transmitted through a control channel or a broadcast channel in an RRC step The look up table is transmitted through a periodic control channel, or broadcast channel While multiple various look up tables are pre-defined offline, the look up table index is transmitted through the control channel or broadcast channel in the RRC step While multiple various look up tables are pre-defined in the RRC step, the look up table index is transmitted through the periodic control channel or broadcast channel The UL power control class (or MCS class) and the spreading code index may be mapped 1:1, 1:M, and M:1 as described in the first embodiment.

In the above description, the control channel or the broadcast channel may be a higher layer signal such as RRC signaling, etc.

Although the present invention is described with the geometry class/UL power control class/MCS class in the above description, the UE may use, select, or be allocated the spreading code by all units of groups or specific users which may discriminate the PAPRs, such as the power level class, the Quality of Service (QoS) class of the UE, energy capability class of the UE, etc.

Figure 22:
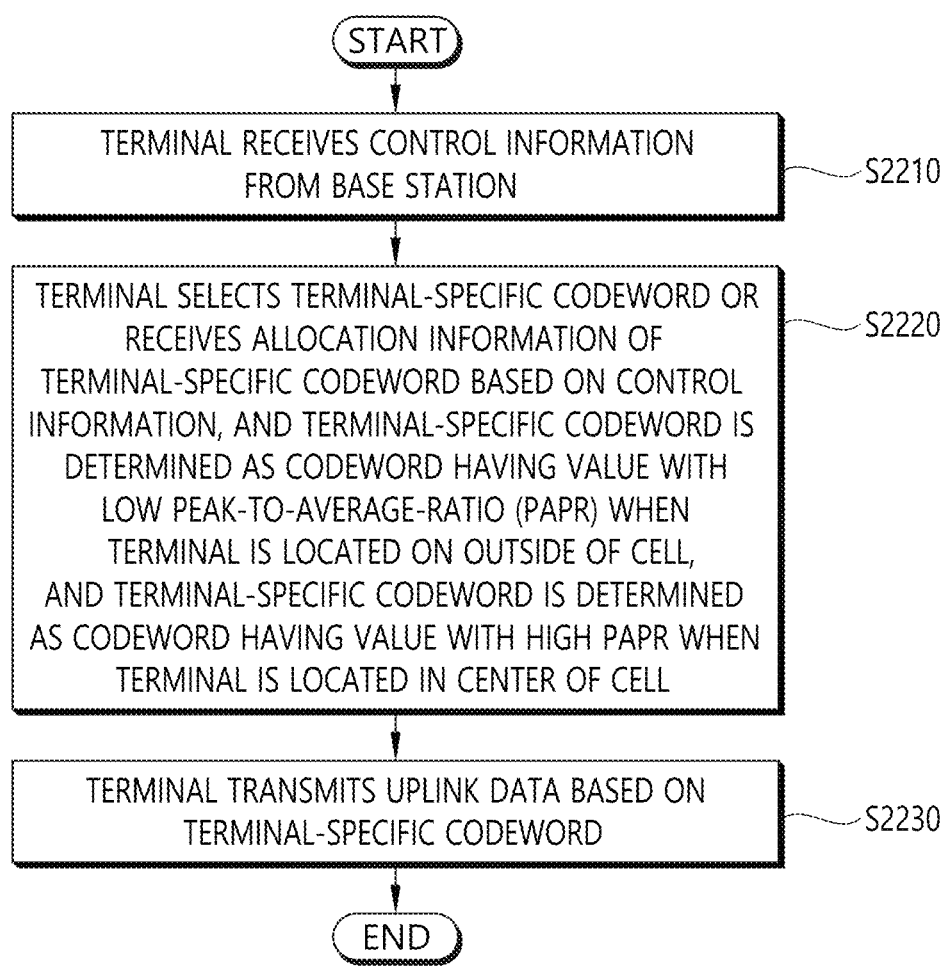
FIG. 22 is a procedure flowchart illustrating a procedure of an NCMA scheme for reducing PAPRs of a UE in a cell according to the present embodiment.

FIG. 22 is a procedure flowchart illustrating a procedure of an NCMA scheme for reducing PAPRs of a UE in a cell according to the present embodiment.

That is, the present embodiment assumes a wireless communication system environment in which a plurality of UEs in the cell performs communication using the spreading based multiple access scheme. The UE may perform the contention based uplink transmission, the semi-persistent scheduling based uplink transmission, or the scheduling based uplink transmission using the spreading based multiple access scheme. The spreading based multiple access scheme includes both an orthogonal coded multiple access scheme and a non-orthogonal coded multiple access scheme.

In step S2210, the UE receives control information from the base station. The control information includes information on a codeword configured by grassmannian sequence. The codeword is included in a codebook pre-defined for the non-orthogonal coded multiple access scheme. That is, the pre-defined codebook may correspond to a non-orthogonal codebook defined in advance between the UE and the base station. If the UE transmits scheduling based uplink data, the control information may correspond to an UL Grant (UL Grant) or Down Control Information (DCI). The control information may be predetermined at the transmitter/receiver according to a predetermined rule.

The control information may further include a codebook index corresponding to a UE-specific codeword determined by a spreading factor, a codeword index in the corresponding codebook, and an MCS level.

In step S2220, the UE may select the UE-specific codeword based on the control information or receive allocation information of the UE-specific codeword. That is, the UE may directly select the UE-specific codeword to be used by itself or use the UE-specific codeword indicated by the base station.

In this case, the UE-specific codeword may be determined in consideration of the position of the UE in the cell and the PAPR. Specifically, when the UE is located in the outside of the cell, the UE-specific codeword is determined as a codeword having a low Peak-to-Average Power Ratio (PAPR) value. When the UE is located at the center of the cell, the UE-specific codeword is determined as a codeword having a high PAPR value.

The procedure for the UE to directly select the UE-specific codeword is as follows.

The control information may be received via a control channel or a broadcast channel. The control channel or the broadcast channel may correspond to a channel for a higher layer signal, such as RRC signaling. Downlink received power may be measured by the UE over the control channel or the broadcast channel Uplink received power may be measured by the base station based on a reference signal and a synchronization signal.

A geometry class may be selected by the UE based on the downlink received power. The geometry class may be determined according to/based on the position of the UE in the cell. For example, as the UE is far from the center of the cell (closer to the outside of the cell), the value of the geometry class may be the smaller and as the UE is closer to the center of the cell, the value of the geometry class may be the larger. That is, the geometry class may be aligned in the ascending order if the UE is located at the center of the cell from the outside of the cell.

In the definition of the geometry class, the definition of the geometry class may not be defined solely by a straight line distance between the UE and the base station. That is, the geometry class may be defined by a change in channel state caused by small-scale fading or shadowing affecting downlink received power. For example, if the geometric location of the UE is located near the center of the cell, but a signal strength is attenuated due to obstacles or diffraction, reflection, transmission characteristics of the signal, etc., the geometry class may be included in the lower geometry class.

The geometry class may be mapped to an index of the UE-specific codeword. A mapping relationship between the geometry class and the index of the UE-specific codeword may be defined as the look up table and shared by the UE and the base station. In addition, the look up table may be periodically transmitted through the control channel or the broadcast channel.

The UE-specific codeword may be selected by the UE based on the geometry class. That is, the UE may select the UE-specific codeword corresponding to the selected geometry class using the look up table.

If the geometry class is changed by mobility of the UE, the UE-specific codeword may be reselected according to/based on event triggering of the UE.

When the UE performs the scheduling based uplink transmission, the UE may report the geometry class to the base station. In this case, the geometry class may be determined according to/based on a power headroom of the UE irrespective of the position of the UE in the cell. That is, if the power headroom of the UE is large, even if the UE is located at the outermost side of the cell, the PAPR is not important, so that the value of the geometry class may be increased. When the value of the geometry class increases according to the power headroom of the UE, the UE may use the UE-specific codeword having the PAPR according to/based on the changed geometry class value.

The procedure for the UE to be indicated the UE-specific codeword from the base station is as follows.

The downlink received power may be reported to the base station. The geometry class may be selected by the base station based on the downlink received power or the uplink received power.

As an example, the UE-specific codeword may be allocated by the base station according to/based on the geometry class. The base station directly indicates the selected geometry class to the UE.

As another example, the uplink power control class of the UE determined by the base station may be received based on control information. Here, since the UE may perform the scheduling based uplink transmission, the control information may correspond to the UL grant or DCI. Therefore, the uplink data may be transmitted through the scheduled resource based on control information.

The uplink power control class may be mapped to an index of the UE-specific codeword. A mapping relationship between the uplink power control class and the index of the UE-specific codeword may be defined as the look up table and shared by the UE and the base station. In addition, the look up table may be periodically transmitted through the control channel or the broadcast channel.

The UE-specific codeword may be selected by the UE based on the uplink power control class. That is, the base station informs the uplink power control class without directly indicating the selected geometry class to the UE. The UE may identify the UE-specific codeword corresponding to the uplink power control class using the look up table.

When the geometry class is changed by the mobility of the UE, the changed geometry class may be detected by the base station based on the downlink received power or the uplink received power. The UE-specific codeword may be allocated by the base station according to/based on the changed geometry class.

In step S2230, the UE transmits the uplink data using the UE-specific codeword. In this case, the UE may perform the contention based uplink transmission, the semi-persistent scheduling based uplink transmission, or the scheduling based uplink transmission using the spreading based multiple access (or non-orthogonal coded multiple access) scheme.

The codeword having a high PAPR value may be generated based on a first column vector of a Hadamard matrix. The codeword having a low value of the PAPR may be generated based on a second column vector of the Hadamard matrix.

The Hadamard matrix may be represented as $$H_{2N} = \begin{bmatrix} H_N & H_N \\ H_N & -H_N^T \end{bmatrix}$$

by H2N as follows.
In this case, $H_1$ may be [1] and $H_2$ may be $$\begin{bmatrix} 1 & 1 \\ 1 & -1 \end{bmatrix}.$$

The first column vector and the second column vector may be vectors whose encoded information bits are converted by a multi-dimensional modulation encoder based on the UE-specific codeword. The first column vector may correspond to a first column of the Hadamard matrix and the second column vector may correspond to a second column of the Hadamard matrix.

Figure 23:
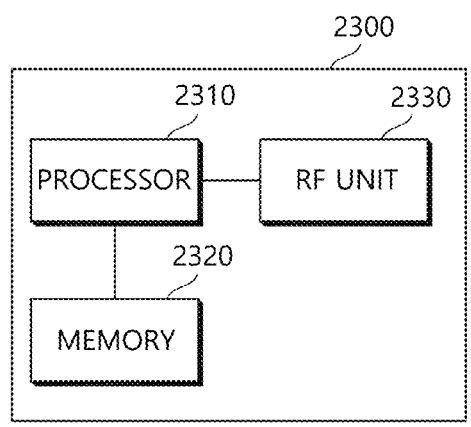
FIG. 23 is a block diagram showing an apparatus for wireless communication for implementing an embodiment of the present invention.

FIG. 23 is a block diagram showing an apparatus for wireless communication for implementing an embodiment of the present invention.

An apparatus 2300 for wireless communication includes a processor 2310, a memory 2320 and a radio frequency (RF) unit 2330.

The processor 2310 may be configured to implement proposed functions, procedures and/or methods described in this description. Layers of the radio interface protocol may be implemented in the processor 2310. The processor 2310 may handle a procedure explained above. The memory 2320 is operatively coupled with the processor 2310, and the RF unit 2330 is operatively coupled with the processor 2310.

The processor 2310 may include application-specific integrated circuit (ASIC), other chipset, logic circuit and/or data processing device. The memory 2320 may include read-only memory (ROM), random access memory (RAM), flash memory, memory card, storage medium and/or other storage device. The RF unit 2330 may include baseband circuitry to process radio frequency signals. When the embodiments are implemented in software, the techniques described herein can be implemented with modules (e.g., procedures, functions, and so on) that perform the functions described herein. The modules can be stored in memory 2320 and executed by processor 2310. The memory 2320 can be implemented within the processor 2310 or external to the processor 2310 in which case those can be communicatively coupled to the processor 2310 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the scope of the appended claims.

What is claimed is:

1. A method for transmitting uplink data in a wireless communication system, the method comprising:

receiving, by a terminal, control information from a base station;

selecting, by the terminal, a terminal-specific codeword or receiving allocation information of the terminal-specific codeword based on the control information; and transmitting, by the terminal, the uplink data based on the terminal-specific codeword, wherein the terminal-specific codeword is determined as a codeword having a value with a low peak-to-average power ratio (PAPR), when the terminal is located on the outside of a cell, wherein the terminal-specific codeword is determined as a codeword having a value with a high PAPR, when the terminal is located in the center of the cell, wherein the control information is received via a control channel or a broadcast channel, wherein downlink received power is measured by the terminal based on the control channel or the broadcast channel, wherein uplink received power is measured by the base station based on a reference signal and a synchronization signal, wherein a geometry class is selected by the terminal based on the downlink received power, wherein the terminal-specific codeword is selected by the terminal based on the geometry class, wherein the geometry class is determined based on a position of the terminal in the cell, and wherein the geometry class is mapped to an index of the terminal-specific codeword.

2. The method of claim 1, wherein when the geometry class is changed by mobility of the terminal, the terminal-specific codeword is reselected based on event triggering of the terminal.

3. The method of claim 1, wherein when the geometry class is reported to the base station, the geometry class is determined based on a power headroom of the terminal irrespective of the position of the terminal in the cell.

4. The method of claim 1, wherein the downlink received power is reported to the base station, and wherein the geometry class is selected by the base station based on the downlink received power or the uplink received power.

5. The method of claim 4, wherein the terminal-specific codeword is allocated by the base station based on the geometry class.

6. The method of claim 5, wherein when the geometry class is changed by the mobility of the terminal, wherein the changed geometry class is detected by the base station based on the downlink received power or the uplink received power, and wherein the terminal-specific codeword is allocated by the base station based on the changed geometry class.

7. The method of claim 4, wherein an uplink power control class of the terminal determined by the base station is received based on control information, wherein the uplink power control class is mapped to the index of the terminal-specific codeword, wherein the terminal-specific codeword is identified by the terminal based on the uplink power control class, and wherein the uplink data is transmitted via a resource scheduled based on control information.

8. The method of claim 1, wherein the codeword having a value with a high PAPR is generated based on a first column vector of a Hadamard matrix, and wherein the codeword having a value with a low PAPR is generated based on a second column vector of the Hadamard matrix.

9. The method of claim 8, wherein the Hadamard matrix is represented with $H_{2N}$ as follows, $$H_{2N} = \begin{bmatrix} H_N & H_N \\ H_N & -H_N^T \end{bmatrix}$$

where, $H_1$ is [1] and $H_2$ is $$\begin{bmatrix} 1 & 1 \\ 1 & -1 \end{bmatrix},$$

and wherein the first column vector and the second column vector are vectors whose encoded information bits are converted by a multi-dimensional modulation encoder based on the terminal-specific codeword.

10. A terminal for transmitting uplink data in a wireless communication system, the terminal comprising:

a radio frequency (RF) unit transmitting and receiving a radio signal; and a processor connected to the RF unit, wherein the processor is configured to receive control information from a base station, select a terminal-specific codeword or receive allocation information of the terminal-specific codeword based on the control information, and transmit the uplink data based on the terminal-specific codeword, wherein the terminal-specific codeword is determined as a codeword having a value with a low peak-to-average power ratio (PAPR), when the terminal is located on the outside of a cell, wherein the terminal-specific codeword is determined as a codeword having a value with a high PAPR, when the terminal is located in the center of the cell, wherein the control information is received via a control channel or a broadcast channel, wherein downlink received power is measured by the terminal based on the control channel or the broadcast channel, wherein uplink received power is measured by the base station based on a reference signal and a synchronization signal, wherein a geometry class is selected by the terminal based on the downlink received power, wherein the terminal-specific codeword is selected by the terminal based on the geometry class, wherein the geometry class is determined based on a position of the terminal in the cell, and wherein the geometry class is mapped to an index of the terminal-specific codeword.

* * * * *